(12) United States Patent
Hind et al.

(10) Patent No.: US 7,225,167 B2
(45) Date of Patent: May 29, 2007

(54) MERCHANDISE-INTEGRAL TRANSACTION RECEIPT AND AUDITABLE PRODUCT OWNERSHIP TRAIL

(75) Inventors: John R. Hind, Raleigh, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/718,942

(22) Filed: Nov. 21, 2003

(65) Prior Publication Data
US 2005/0114270 A1 May 26, 2005

(51) Int. Cl.
*G06Q 99/00* (2006.01)
(52) U.S. Cl. .............. 705/64; 726/26; 705/51; 705/57; 705/59; 705/65; 380/200; 380/201; 380/202; 380/203
(58) Field of Classification Search ............ 705/50–79; 380/200–203; 726/26–33
See application file for complete search history.

(56) References Cited

U.S. PATENT DOCUMENTS

| | | | |
|---|---|---|---|
| 5,008,661 A | | 4/1991 | Raj |
| 5,629,981 A | | 5/1997 | Nerlikar |
| 6,591,252 B1 | * | 7/2003 | Young .................. 705/67 |
| 2001/0044854 A1 | | 11/2001 | Frary |
| 2001/0053949 A1 | | 12/2001 | Howes et al. |
| 2002/0032626 A1 | | 3/2002 | DeWolf et al. |
| 2002/0076685 A1 | | 6/2002 | Ueno |
| 2002/0077982 A1 | | 6/2002 | Pellegrini |
| 2002/0116283 A1 | | 8/2002 | Chatani |
| 2002/0178363 A1 | | 11/2002 | Ambrogio et al. |
| 2003/0004885 A1 | | 1/2003 | Banerjee et al. |
| 2003/0024988 A1 | * | 2/2003 | Stanard ................. 234/462.01 |
| 2003/0127508 A1 | | 7/2003 | Jones |
| 2004/0015713 A1 | * | 1/2004 | Abe et al. ................... 713/200 |
| 2004/0128516 A1 | * | 7/2004 | Okamoto et al. .......... 713/179 |

FOREIGN PATENT DOCUMENTS

EP          0936805     * 8/1999

OTHER PUBLICATIONS

"How Anti-shoplifting Devices Work", printed Aug. 27, 2003, <http://electronics.howstuffworks.com/anti-shoplifting-device.htm/printable> (p. 1-10).
Webb, Warren, "Stop! Thief", *EDN*, Jun. 21, 2001 (p. 52, 54, 56).

* cited by examiner

*Primary Examiner*—Jalatee Worjloh
(74) *Attorney, Agent, or Firm*—Marcia L. Doubet; Jeanine S. Ray-Yarletts

(57) ABSTRACT

Techniques are disclosed for writing data directly onto a product to record each ownership transfer. As a result, the product itself now carries a traceable, auditable, non-forgeable, non-repudiable proof of ownership (and, optionally, ownership history) that can be used in a variety of ways. This recorded ownership transfer information provides an electronic receipt, which may be used by the present owner to prove his or her ownership. (Optionally, other types of transfers may be recorded in addition to, or instead of, ownership transfers.) A transfer agent or registrar creates a unique transaction identifier to represent the transfer, and preferably creates a cryptographic signature over fields representing the transfer. This information is then recorded in a repository that is external from the product.

18 Claims, 19 Drawing Sheets

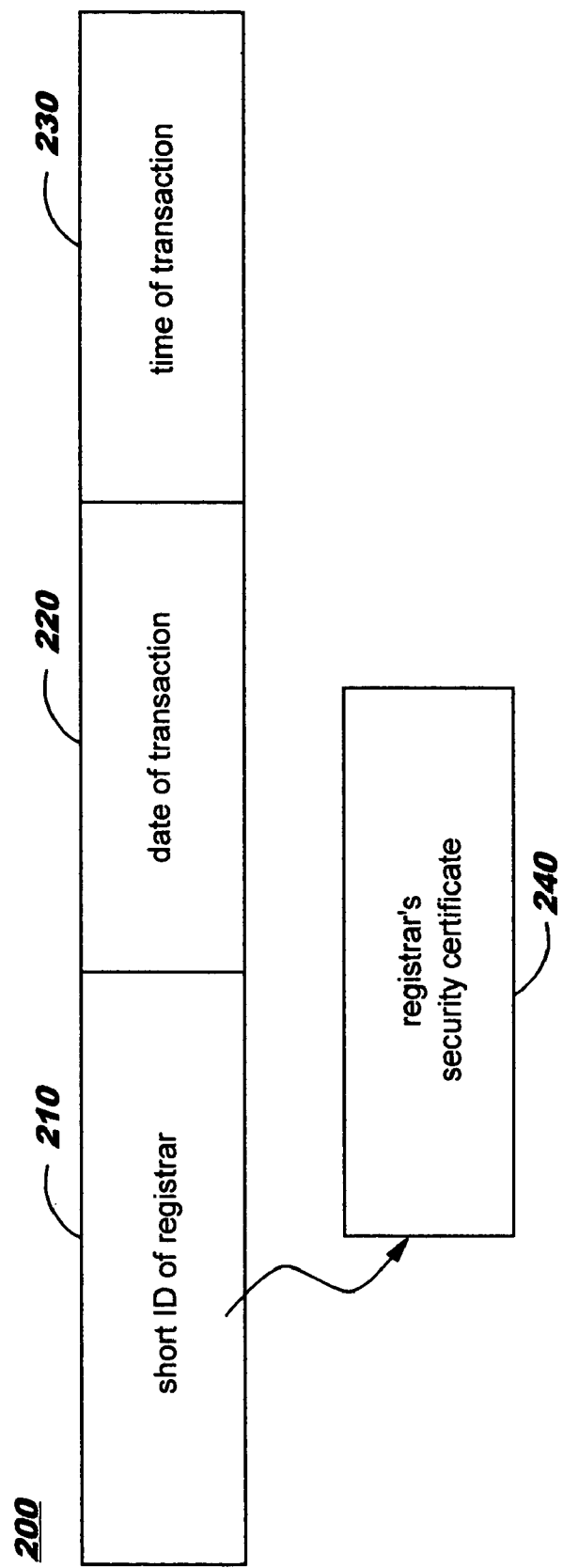

| |
|---|
| GUID — 381 |
| seller ID — 382 |
| buyer ID — 383 |
| date / time — 384 |
| price — 385 |
| previous GUID — 386 |
| digital signature over transaction — 387 |
| digital signature over audit record — 388 |

MERCHANDISE-INTEGRAL TRANSACTION RECEIPT AND AUDITABLE PRODUCT OWNERSHIP TRAIL

BACKGROUND OF THE INVENTION

1. Field of the Invention

The present invention relates to automated computing, and deals more particularly with techniques for encoding ownership transfer transactions directly onto a product (such as by using radio-frequency identification, or "RFID", technology) in a secure manner.

2. Description of the Related Art

Electronic article surveillance ("EAS") technologies have been used for many years to protect assets and merchandise from theft. The basic principle behind most prior-art EAS systems includes using a transmitter to create an electromagnetic field across a store's exit area and a receiver than can detect variations in the field. Small tuned circuits or magnetic material inside security tags that pass through the exit modify the field enough for the receiver to detect the change and activate an alarm. A retailer typically attaches the security tags to high-risk items, and the EAS notifies him or her when a tag passes through the exit field. The security tag must be removed or deactivated at the point of sale to prevent the alarm from sounding.

More recently, a new technology called Radio Frequency Identification, or "RFID", has been introduced for labeling items of merchandise and tracking their physical location, and may be used from manufacturing through distribution and retail sale. RFID differs from passive EAS technologies in several important ways. An RFID tag includes both passive elements (an antenna) and active elements (typically a read-write data memory, control circuitry, and a radio frequency transponder). RFID tags are typically not self-powered, but may receive their power via capacitive coupling from an external radio frequency source. When brought into proximity with an RFID reader at a typical effective distance of about 1 centimeter to 5 meters (depending on the type of tag), the RFID tag receives sufficient power for clocking the semiconductor and analog portions comprising its transponder, control circuits, and data memory through enough clock cycles that the tag can return the data bits from its memory as a digitally-encoded radio frequency signal. This is advantageous because the tag can be read (or written) from a distance without the necessity of line-of-sight, as had been required to read a bar code with a laser scanner.

A representative RFID tag 100 of the prior art is illustrated in FIG. 1, showing a coiled antenna 120 (which in this example takes on a generally square shape) embodied on some type of substrate 130. The tag 100 includes an integrated circuit 110 containing non-volatile memory, logic circuitry, and communications circuitry. This integrated circuit is attached to antenna 120, which may be implemented as an inductor coil. The substrate 130 onto which the electronic equipment is fabricated may be, for example, a clear, flexible film.

The capacity of an RFID tag's data memory today is typically 5 to 256 bytes. The memory typically stores an Electronic Product Code or "EPC" that assigns a searchable number to each object that bears an RFID tag. Whereas the Universal Product Code or "UPC" commonly used in bar-coding applications identifies a product only by product type, an EPC goes farther and identifies a consumer product individually. Present versions of the EPC use 96 bits of information: an 8-bit header, two sets of 24 bits identifying the manufacturer and product type, and a 40-bit serial number. Ninety-six bits encode enough information to uniquely identify trillions of objects. (See "Beyond the Bar Code" and companion article "What's My Number" by Charlie Schmidt, *Technology Review Magazine*, March 2001, p. 80–85.)

Rather than an EPC, an RFID tag of the prior art may bear an item SKU ("stock-keeping unit") and a unique item serial number. An SKU is an identifier used for categorizing products, for example by item type. The serial number may be globally unique, or unique within the SKU number. A combination of SKU and serial number may therefore be used to uniquely identify a particular item of that particular type. References herein to using an EPC on an RFID tag are therefore by way of illustration and not of limitation. Whether using an EPC or an SKU with serial number with an RFID tag, this identifying information is stored in the small memory area on the RFID tag.

RFID technology has generally been utilized for inventory control (e.g., in a warehouse, manufacturing, or distribution facility) and for item identification at the point of sale as an improvement over today's nearly-ubiquitous laser-scanned bar codes. The use of RFID to deter theft has been suggested in several contexts. Notably, early RFID literature suggested that RFID could prevent employees from stealing items from a store's inventory by improving inventory control. The literature also suggested that RFID could deter theft in the distribution chain between the manufacturer and retailer by actively monitoring inventory in trucks and shipping containers to ensure that merchandise was not diverted to unintended destinations.

The passive transponder in an RFID chip can return a series of bits, such as the EPC, on command. Some kinds of RFID tags are also updateable, providing a small amount of read/write storage. With reference to FIG. 1, for example, when the tag 100 is subjected to a radio-frequency signal, the integrated circuit 110 reads the radio-frequency signal from the antenna 120 and interprets the signal as a command to read or write data from or to memory located on the integrated circuit.

Commonly-assigned and co-pending U.S. patent application Ser. No 09/790,104 (filed on Feb. 21, 2001; now U.S. Pat. No. 7,000,834), titled "Method To Address Security And Privacy Issues of the Use of RFID Systems to Track Consumer Products" (hereinafter referred to as "the first related invention" and hereby incorporated herein by reference) discloses overwriting an RFID tag's memory with new data, such as a shortened version of the product's serial number, at a point of sale to signify that the tagged item has been paid for. This patent application also discloses formatting the data memory on an RFID tag with control bits, thereby providing a type field to dictate access control such as whether a field can be overwritten. According to preferred embodiments of this first related invention, logic invoked when an update of the data memory is requested checks the associated control field, and if updating is not allowed, the logic exits rather than performing the update. Using the disclosed techniques, an unscrupulous store employee can be prevented from reprogramming the RFID tag of an expensive item with data representing an inexpensive item in order to pay a lower price for the expensive item.

RFID tags can be created using very inexpensive manufacturing techniques; the antenna portion can be printed on packaging material with conductive carbon ink, and the semiconductor portion—as small as 3 millimeters square—can be mounted to the antenna with glue. The cost of RFID tags is expected to decline to the point of being cost-effective even on small-value retail items. Thus one can assume that in the near future, RFID tags on merchandise will become nearly ubiquitous. One can also assume that the capacities of the non-volatile memories in RFID tags will grow far beyond today's typical 256 bytes. It is also likely that advances in data storage technologies will make large, inexpensive write-once read-many ("WORM") non-volatile memories, which are designed to prevent erasure or overwriting of data, feasible and ubiquitous.

SUMMARY OF THE INVENTION

An object of the present invention is to provide an auditable trail of product ownership transfers.

Another object of the present invention is to provide a merchandise-integral record of product ownership transfers.

A further object of the present invention is to establish a secure electronic transaction receipt for a product.

Still another object of the present invention is to provide techniques whereby information securely stored on a product identifies its current owner.

Another object of the present invention is to provide techniques for registering product ownership transfers.

Yet another object of the present invention is to leverage RFID technology in novel ways.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/or computer program products. In one aspect, the present invention provides techniques for registering ownership transfers, comprising: receiving information describing an ownership transfer of an identified product; assigning a unique identifier to represent the ownership transfer; computing a cryptographic signature over the assigned unique identifier and at least a portion of the received information; and registering the ownership transfer by storing the received information, the computed signature, and the assigned unique identifier in a repository.

The received information may also describe prior ownership transfers of the identified product. The registration of the transfer preferably uses the assigned unique identifier as an index when storing the received information, the computed signature, and the assigned unique identifier in the repository. The assigned unique identifier is preferably provided to the identified product for recording thereupon.

This aspect may further comprise operations, responsive to receiving the information, of: locating information describing a most-recent ownership transfer of the identified product; and continuing with the assigning, computing, and registering only upon determining that a previously-computed cryptographic signature of the located information is valid.

Preferably, the received information is transmitted from product-integral storage of the identified product. This product-integral storage may be, for example, a memory of a radio frequency identification device or a memory of a machine-readable identification device.

In this aspect, the identified product's current owner may be determined by consulting the registered ownership transfer. This aspect may further comprise registering a subsequent ownership transfer of the identified product. Preferably, registration of the subsequent ownership transfer further comprises: receiving information describing the subsequent ownership transfer; locating information describing the registered ownership transfer; and continuing with the registration of the subsequent ownership transfer if the cryptographic signature of the located information is valid. Continuing with the registration preferably further comprises: assigning a new unique identifier to represent the subsequent ownership transfer; computing a new cryptographic signature over the assigned new unique identifier and at least a portion of the received information describing the subsequent ownership transfer; and registering the subsequent ownership transfer by storing the received information describing the subsequent ownership transfer, the new computed signature, and the new assigned unique identifier in the repository.

In another aspect, the present invention provides techniques for providing a product-integral transaction receipt, comprising: computing, for each transfer of the product, a cryptographic signature over fields describing the transfer; permanently recording the cryptographic signature, along with at least a portion of the fields, on the product; and recording the cryptographic signature and the fields in a separate repository. The permanent recording may use, by way of example, a bar code representation; a matrix code representation; an indelible text representation; or a radio frequency identification device.

In yet another aspect, the present invention provides techniques for establishing a secure electronic transaction receipt for a product, comprising: accessing a product-integral ownership record to determine a current owner of the product; and securely revising the product-integral ownership record to reflect a new owner of the product, pursuant to a transfer of the product, only upon ensuring that a purported transferor in the transfer is the current owner. The securely revising preferably further comprises: computing a cryptographic signature over data pertaining to the transfer; and recording the cryptographic signature, along with at least a portion of the data pertaining to the transfer, in the product-integral ownership record.

This aspect may further comprise logging a record of the transfer in an audit repository. This record may further comprise the cryptographic signature and the data pertaining to the transfer. The data pertaining to the transfer preferably includes a globally-unique identifier associated with the transfer, and this globally-unique identifier is preferably used as an index for logging the record (and is also preferably recorded in the product-integral ownership record).

In still another aspect, the present invention comprises techniques for providing an auditable trail of product transfers, comprising: computing, for each transfer of a particular product, a globally-unique identifier associated with the transfer; computing a cryptographic signature over one or more values describing the transfer; recording the cryptographic signature, the globally-unique identifier, and zero or more of the values in a product-integral ownership repository on the particular product; recording an audit record for the transfer in an audit repository, wherein the audit record comprises the cryptographic signature, the globally-unique identifier, and the values; and tracing transfers of the particular product using each of the audit records that pertains to the particular product. In this aspect, each audit record that pertains to the particular product may further comprise a second globally-unique identifier which is associated with a next-previous transfer of the particular product, in which case the tracing preferably further comprises iteratively using the second globally-unique identifier, when processing the audit record, to locate the audit record which records the next-previous transfer.

The present invention may also be used advantageously in methods of doing business, for example by providing an ownership transfer agent service. In one aspect, this comprises: receiving transfer information for an ownership transfer; creating a unique identifier to represent the transfer; registering the transfer, which preferably includes computing a digital signature over the transfer information and its unique identifier and then logging this transfer record; and (optionally) charging a fee. The fee may be collected under various revenue models, such as subscriptions, pay-per-use billing, monthly or other periodic billing, and so forth. In one approach, the received transfer information preferably comprises a transfer history of the product and values pertaining to the transfer, and the portion over which the digital signature is computed for registering the transfer preferably comprises the transfer history of the product and the values pertaining to the transfer. The transfer agent service may further comprise transmitting, from the transfer agent for recording in a product-integral repository on the product, the globally-unique identifier, the portion of the received transfer information, and the digital signature. In addition or instead, the service may further comprise computing a second digital signature over the values pertaining to the transfer, in which case the digital signature, the second digital signature, and the values pertaining to the transfer are preferably logged during the registration of the transfer.

The present invention will now be described with reference to the following drawings, in which like reference numbers denote the same element throughout.

BRIEF DESCRIPTION OF THE DRAWINGS

FIG. 2 illustrates a globally-unique identifier ("GUID") that may be used to identify a transaction, according to embodiments of the present invention;

FIGS. 3A–3F illustrate various forms of an ownership transfer record format that may be used by embodiments of the present invention;

DESCRIPTION OF PREFERRED EMBODIMENTS

Figure 1:
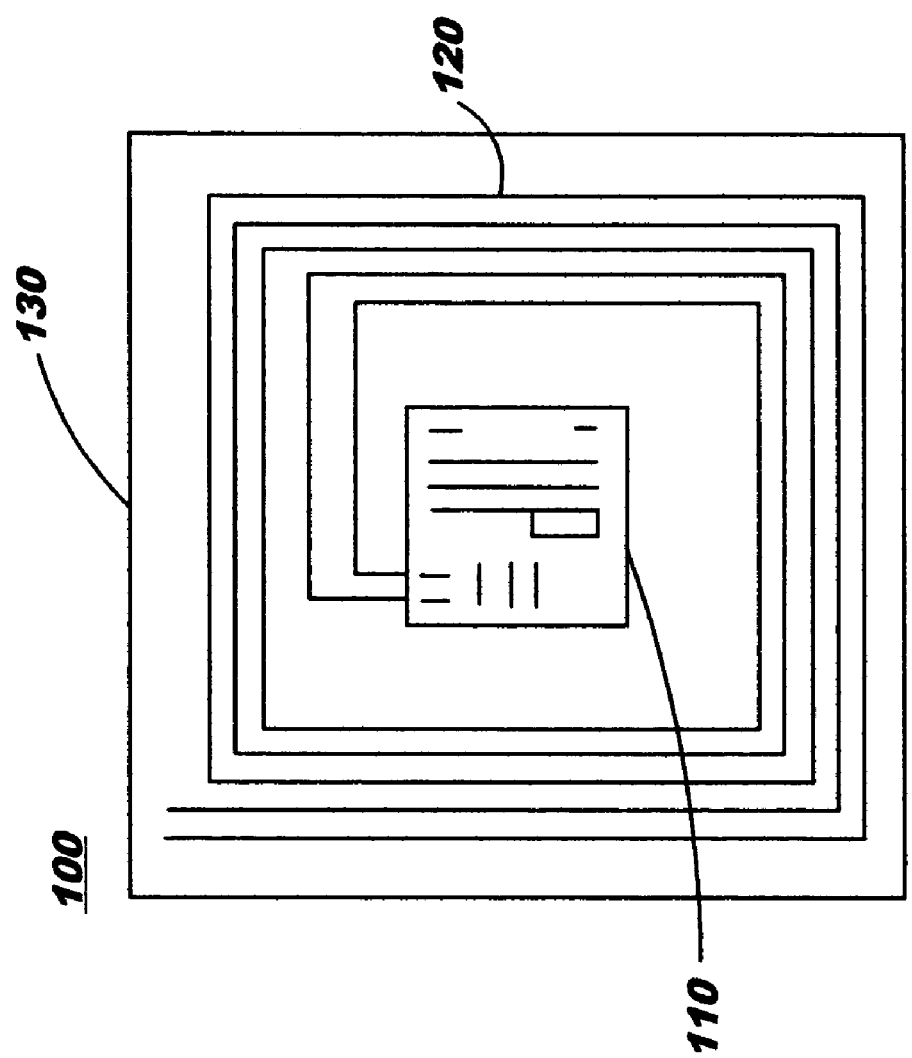
FIG. 1 illustrates a representative RFID tag, according to the prior art.

The present invention provides techniques for writing data directly onto a product to record each ownership transfer. As a result, the product itself now carries a traceable, auditable, non-forgeable, non-repudiable proof of ownership (and, optionally, ownership history) that can be used in a variety of ways. Examples include warranty service, returns, repairs, subsequent ownership transfer, legal proof of ownership, product liability claims, theft deterrence, surveillance, e-business transactions related to just-in-time inventory management, barter, auction, and so forth. Preferably, the information is written onto the product at the time of the ownership transfer (or shortly preceding or following the transfer transaction). This recorded ownership transfer information provides an electronic receipt, which may be used by the present owner to prove his or her ownership. The disclosed techniques enable eventually obsoleting the need for a separate receipt or ownership document.

Preferred embodiments write the ownership data, secured with public key encryption techniques, onto a non-volatile memory on the RFID tag of a product using a read/write RFID transponder, although traditional indelible marking techniques such as engraving, bar codes, 2-dimensional or matrix codes could also be used advantageously for writing this secured ownership data. Alternative embodiments write the secured ownership data on existing products that already contain data memories and input/output capabilities, such as computers and peripherals, pervasive computing devices, consumer electronics, and appliances. (Commonly-assigned and co-pending U.S. Pat. No. 7,069,452, entitled "Methods, Systems and Computer Program Products for Secure Firmware Updates", and U.S. Pat. No. 6,976,163, entitled "Methods, Systems and Computer Program Products for Rule Based Firmware Updates Utilizing Certificate Extensions and Certificates for Use Therein", disclose techniques for creating a secure memory within the flash memory of computing devices, consumer electronics, and appliances. The teachings in these commonly-assigned inventions, which were filed on Jul. 12, 2000 and have Ser. Nos. 09/614,982 and 09/614,983, respectively, may be leveraged by alternative embodiments which write ownership data into products containing data memory.)

As a side effect, the disclosed techniques provide an auditable product serial number which can deter counterfeiting.

Each party in the chain of ownership for a product has incentives to keep accurate records concerning that party's acquisition and disposition of the product. Some of these incentives arise because of the possibility of a product liability lawsuit. A consumer would like to be able to prove everyone who has previously owned the product, for example, and anyone who once owned the product would like to be able to prove that ownership was transferred, to whom, and when.

To provide such verifiable records, the present invention uses transaction audit registrars and an expanded-memory RFID chip implementing field-control features of the type described in the first related invention to provide a practical means of implementing a non-repudiable product ownership history. In preferred embodiments, each time product ownership is transferred, a non-changeable GUID representing the transfer is added to the RFID chip on the product, and overwriteable fields representing the details of the last transaction and the signature of an overseeing transaction audit registrar are updated to the RFID chip as well. (The overwriteable fields in the product-integral record, discussed below with reference to FIGS. 3A–3D, are also referred to herein as registrar-updateable fields.)

The GUID is a value that uniquely identifies an audit record (i.e., an auditable record of an ownership transfer), and is preferably constructed by a registrar. The audit record is preferably logged on a WORM device (i.e., a device that is distinct from the product-integral record) and may be retrieved as needed by an appropriate authority, such as a court hearing a product liability case, a law enforcement agency investigating a theft, or a trade authority engaged in stopping a gray-market activity. As illustrated by the sample GUID format 200 in FIG. 2, the GUID preferably contains at least a well-known short identifier ("ID") 210 assigned to the transaction audit registrar and a date 220 and time 230 of the transaction for which this GUID serves as an index. In addition to, or instead of, specifying the date and time of the transaction, one or more other values that serve to establish a globally-unique value for GUID 200 may be used without deviating from the scope of the present invention. Each registrar is assigned at least one private/public key pair, the public key being published in a well-known certificate which is associated with the registrar's short ID (see reference number 240) for use by any interested parties wishing to verity a signature over data created by use of the private key.

A number of alternative formats may be used for recording product-integral ownership information and also for recording audit records, without deviating from the scope of the present invention. Choice of the record format used for product-integral information, in particular, may depend on the type of device on which the information will be recorded. For example, the format used with a space-constrained RFID chip may be more compact than the format used with a pervasive computing device, which in turn may be more compact that the format used with a laptop or desktop computer. Several alternative formats will now be described with reference to FIGS. 3A–3D. (In an environment where an audit registrar supports multiple different formats, a format identifier may be added to each record to facilitate format-specific parsing, although this has not been illustrated.)

Figure 3A:
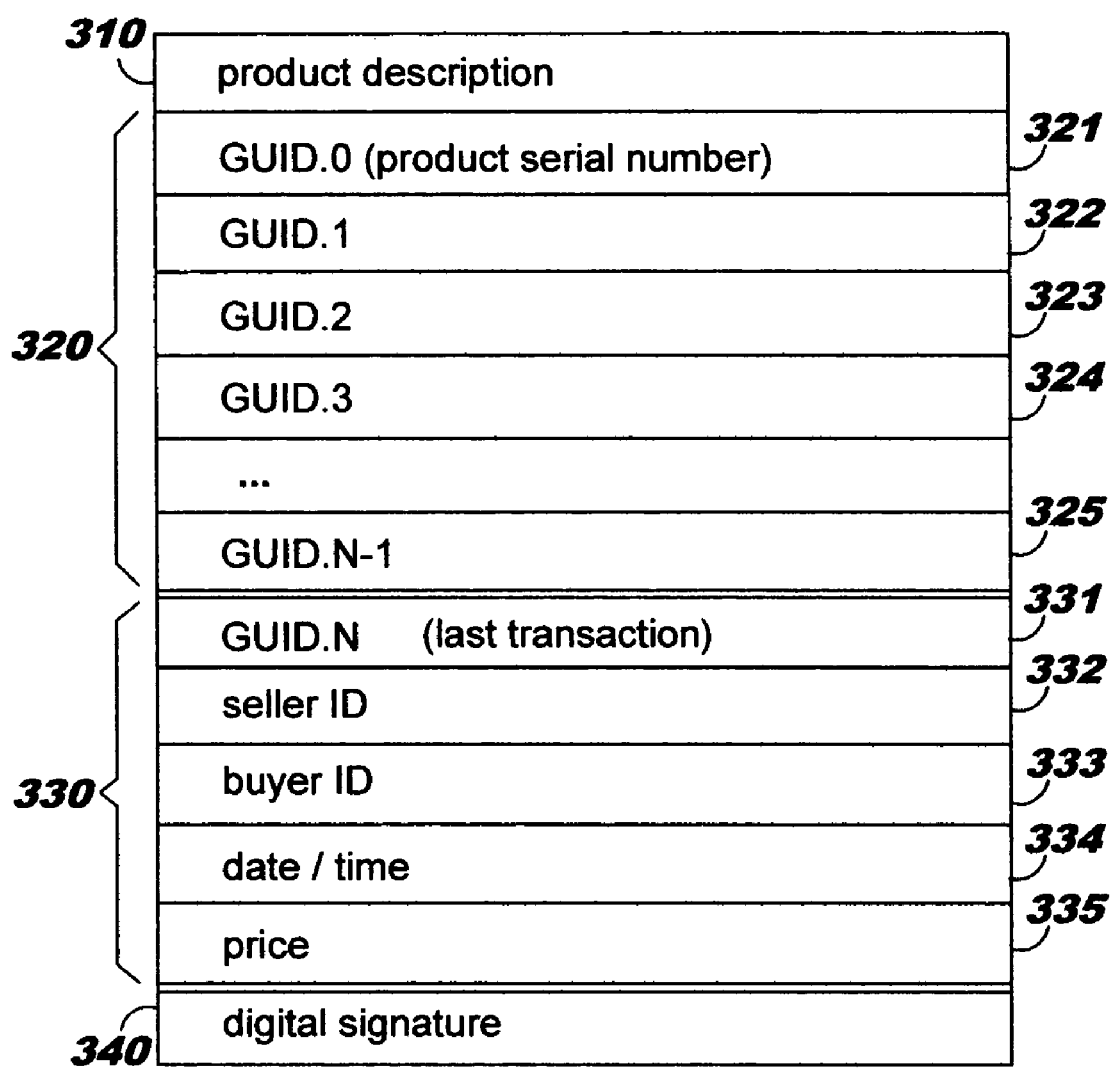

FIG. 3A illustrates a first sample format for an ownership transfer record 300 to be stored on a product (where this format is best suited to a device without severe space constraints). As shown therein, so optional product-specific description 310 (such as the manufacturer's model number) may be recorded (preferably as the first entry) in the product's ownership transfer record. Some number of GUIDs 320 are present in the record, each corresponding to a previous transfer, thereby providing a history of product transfers. In preferred embodiments, the first such GUID 321 serves as a product serial number which uniquely identifies the product. Using a GUID (such as the product serial number, or alternatively one of the transaction-specific GUIDs illustrated at reference numbers 322–325 and 331) as an index for ownership transfer records within the audit registry thereby uniquely identifies the product associated with each such record. (The serial number 321 is preferably created when the ownership transfer record 300 is initialized, as exemplified by the logic in FIGS. 6 and 7, which are described below.)

In FIG. 3A, the GUIDs 321–325 are depicted as "GUID.x", where "x" is intended to represent some integer value, as in an array. Using this notation, the last transaction (i.e., the most-recent, or "nth", transaction) is represented by GUID.N, as shown at 331, and GUID 325 corresponds to the previous transaction (i.e., entry "N–1" in an array-like representation). In this sample format 300, additional information 330 pertaining to the last transaction is also recorded. Finally, a digital signature field 340 is also provided. These fields will now be described in more detail.

Preferably, fields 310 and 320 are created as read-only fields, whereas fields 330 and 340 are registrar-updateable (i.e., read-write) fields. Last transaction field 330 is logically structured as a registrar-updateable field that comprises a number of sub-fields. A GUID 331 provides a unique identifier for this most-recent transaction. As discussed with reference to FIG. 2, the GUID identifies the transaction audit registrar that registered (i.e., recorded) this most-recent transaction, and the registrar's short ID within the GUID 331 can be used to locate a security certificate (often referred to as a "digital certificate" or an "X.509 certificate") that identifies the public key used by the registrar for securing this transaction. (As an alternative to extracting the short ID from GUID 331, a separate sub-field within field 330 may be provided for identifying the registrar, if desired, and/or a separate sub-field may be provided for referencing or recording the registrar's security certificate.)

Last transaction field 330 also preferably specifies an ID 332 of the seller and an ID 333 of the buyer. It may be desirable to repeat the date and time 334 of the transaction as a sub-field (or as separate sub-fields), even though this information forms a portion of the GUID in preferred embodiments. Optionally, the price and/or other terms of the transaction may also be recorded, as shown at 335.

Preferably, the digital signature value 340 is computed over fields 310 through 330 (i.e., the entire contents of record 300). As is well known in the art, use of digital signatures generally comprises computing a hash value over a set of fields (such as fields 310 through 330), and then encrypting this hash value using a private key value (in this case, the private key of the registrar) with public key encryption techniques. The resulting digital signature stored in field 340 can then be decrypted only with the registrar's associated public key from the public/private key pair which is represented by the registrar's security certificate (which in preferred embodiments is identified by the short ID within the GUID 331, as has been discussed). If a newly-computed hash over the same set of fields is identical to the decrypted hash value, then the values of those fields were not changed from the values used by the registrar when originally computing the digital signature. In this manner, the digital signature field 340 can be used to determine whether the recorded ownership transfer transaction is legitimate.

Figure 3B:
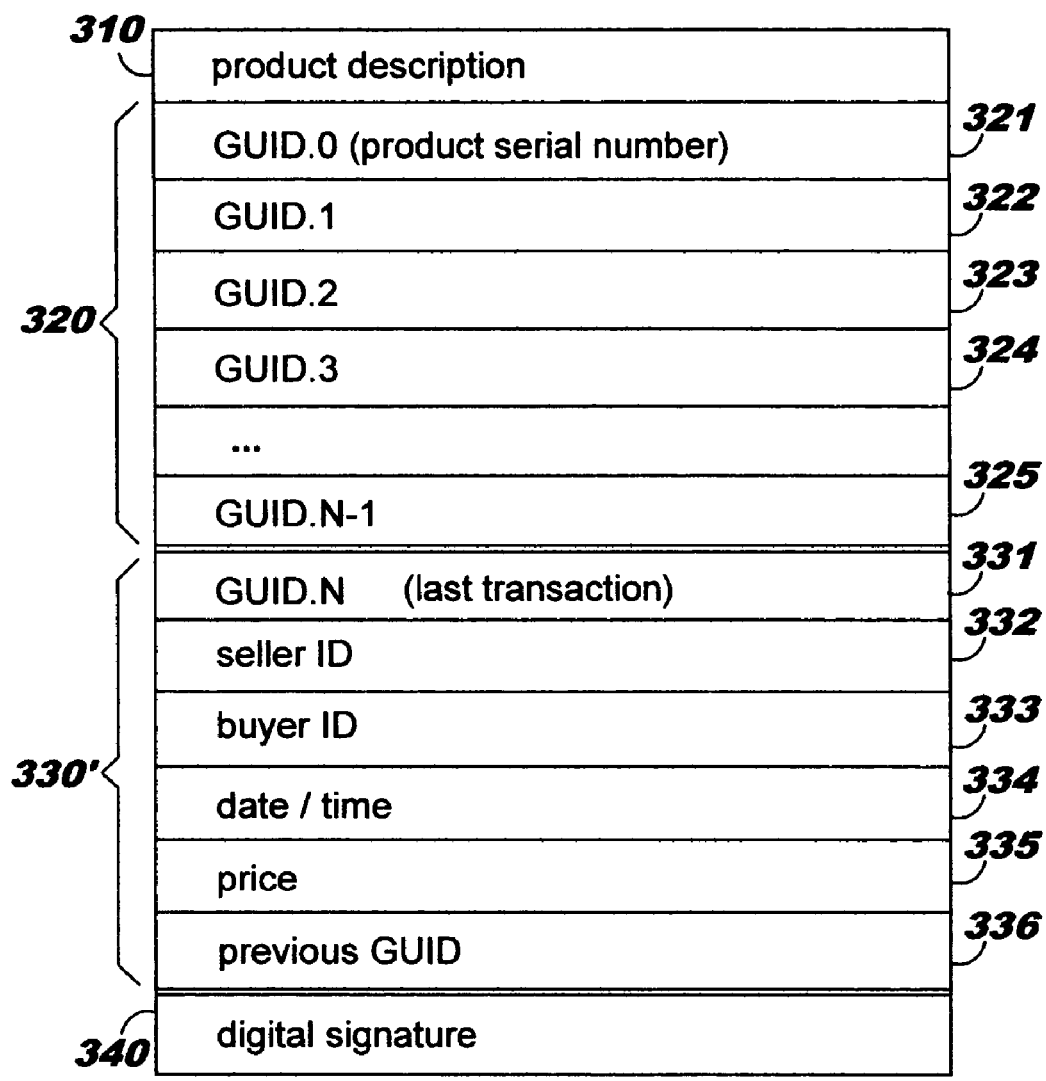

In a second sample format 350, illustrated in FIG. 3B, last transaction field 330' contains an additional sub-field 336 that specifies the GUID of the previous transaction. This value should be identical to the value in the last field (shown at reference number 325 in the example) of the ownership history information 320. While sub-field 336 introduces some redundancy into record format 350, it provides consistency between the format of field 330' of the product-integral record and fields 381–386 of audit registry record 380 shown in FIG. 3E. (Having the previous GUID specified within the last transaction field of the audit registry enables more efficiently constructing an audit trail of ownership transfers when accessing records in the audit registry.)

Figure 3C:
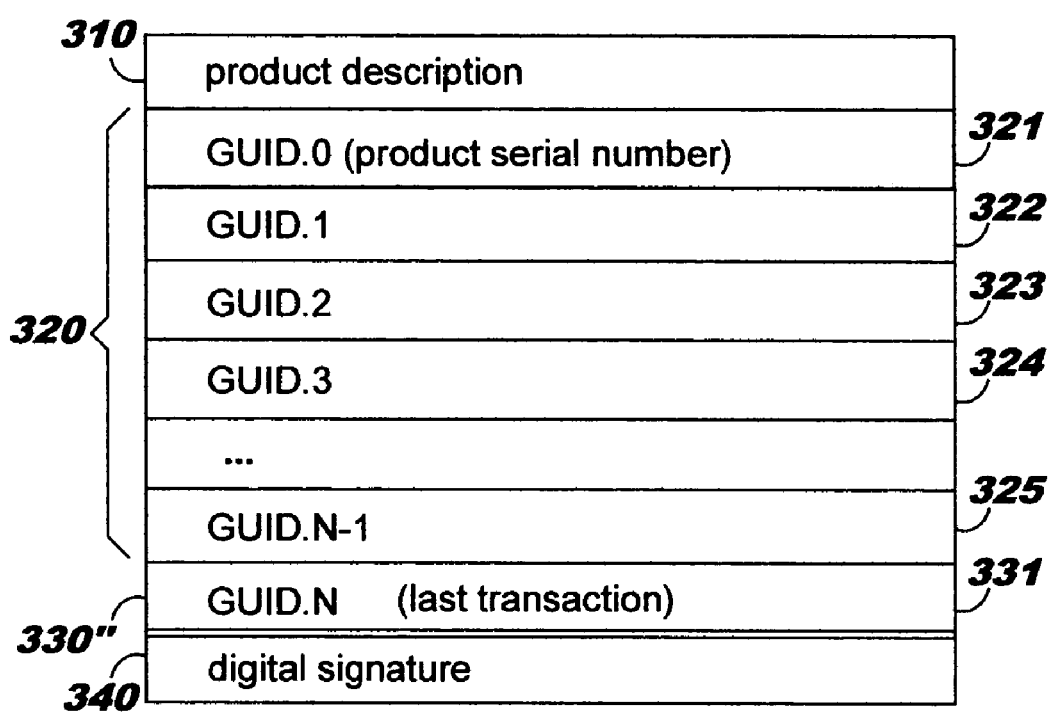

In a third sample record format 360, shown in FIG. 3C, the last transaction field 330" comprises only the GUID 331 for this transaction (and a corresponding digital signature 340 is created for the transaction as well, preferably covering all fields 310–330"). Further details of this last transaction (such as the seller ID and buyer ID) can be retrieved from the audit repository, if needed, using GUID 331 as an index. This sample format 360 is advantageous when product-integral storage space is severely constrained.

Figure 3D:
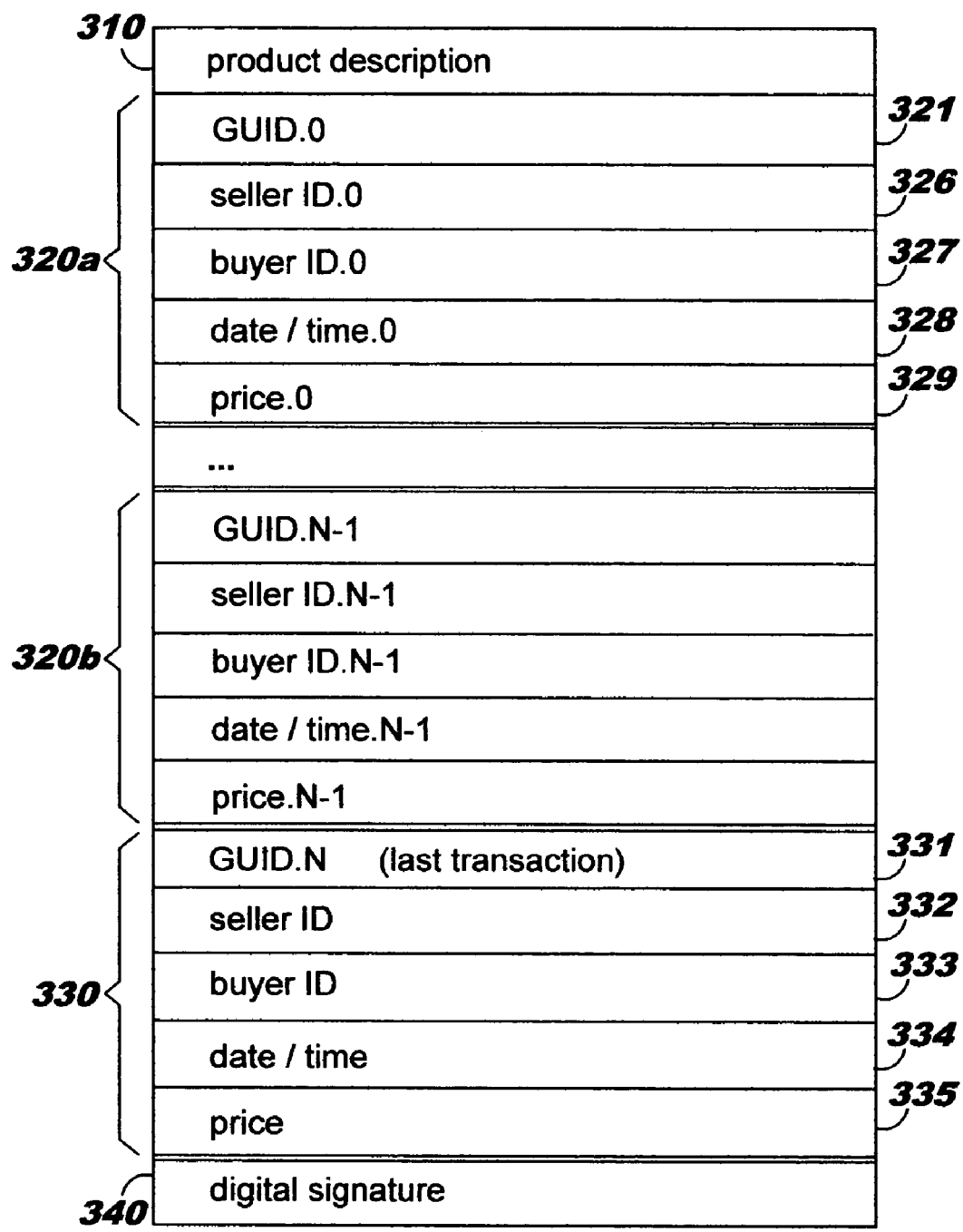

In a fourth sample record format 370, shown in FIG. 3D, the product-integral ownership transfer record itself specifies details pertaining to earlier transactions. That is, the individual transactions within the transaction history field preferably contain the same type of information which has been described for last transaction field 330 in FIG. 3A. See fields 320a and 320b in FIG. 3D. In these fields, the array-like notation has been used in the figure to illustrate the transaction-specific sub-field values. For example, "seller ID.0" in sub-field 326 is intended to illustrate that this seller ID is the seller from the original (i.e., "0-th") transfer for which GUID 321 was created. Similarly, the buyer ID 327, date/time 328, and price 329 reflect the original transfer. This format 370 may be advantageous for products where availability of on-product memory or storage space is not an issue.

In an embodiment where the product-integral ownership information is recorded indelibly using bar codes, matrix codes, indelible ink or other physical markings (rather than an RFID chip or similar technology), the ownership information preferably comprises an engraved or embossed representation of the digitally-signed GUID of each transfer. Each ownership transfer, including the transfer to the current owner, thereby remains permanently on the product as a product-integral ownership transfer log. In this embodiment, a format of the type shown in FIG. 3C (where the on-product information omits details of the transaction, such as the seller and buyer IDs) will include, for each previously-recorded GUID 321–325, the digital signature that was computed when that GUID was initially written to the product (If a format of the type presented in FIG. 3D is used, where transaction-specific details are written to the product, then each record 320a, 320b in the product history will also include the digital signature originally computed for that transaction.)

According to preferred embodiments, any of the transaction-specific GUID values from an ownership record (such as GUIDs 321–325 and 331 in sample record format 300 of FIG. 3A) may be used as an index to locate a corresponding audit record in a repository of audit records. The audit repository records can be used to construct a chain of product ownership, thereby determining who is the currently-registered product owner. Several different sample formats for the audit records will now be described, by way of illustration but not of limitation, with reference to FIGS. 3E and 3F (as distinguished from the product-integral record formats illustrated in FIGS. 3A–3D).

FIG. 3E shows a first sample audit record format 380 that may be used when recording information in an audit registry. As indicated earlier, each record in the audit registry has a transaction-specific GUID 381 that is preferably used as a record key or index. As an alternative, the index may include the product serial number (which in preferred embodiments is the initially-created GUID, as has been discussed).

Details of the associated transaction are recorded in the record 380, as shown in this first sample format at reference numbers 382–385. In addition, the GUID of the previous transaction is preferably recorded, as shown at 386. This previous GUID was discussed with reference to 336 of FIG. 3B. For example, to determine each previous owner of a particular product using audit records of the format 380, the previous GUID field 386 may be used as an index to locate the next-previous transfer record, and its previous GUID field is used to locate the prior transfer record in a recursive manner, until locating the original transfer record. (In preferred embodiments, the original transfer record describes the transfer from the original manufacturer to a retailer or other distributor. Refer to the discussion of FIGS. 6 and 7, which pertain to initializing the transfer information for a product.)

This record format 380 may be used with any of the product-integral record formats illustrated in FIGS. 3A–3D. In preferred embodiments, the registrar creating the audit record is presented with the transaction-specific details 382–385 and the GUID 386 of the previous transaction, and is responsible for generating the GUID 381 for the new transaction and a corresponding digital signature (as discussed in more detail with reference to FIGS. 5 and 6). In one approach, two digital signatures 387, 388 are recorded in the audit registry. In this example format 380, a first digital signature 387 covers the entire transaction, which includes the product's entire ownership transfer history (e.g., as illustrated in FIGS. 3A–3C at 320 and in FIG. 3D at 320a and 320b). This digital signature 387 then matches the digital signature 340 stored in the product-integral record. A second digital signature 388 covers only the fields in the audit record 380 (which, in this example format, are a subset of the fields in the on-product record).

Figure 3F:
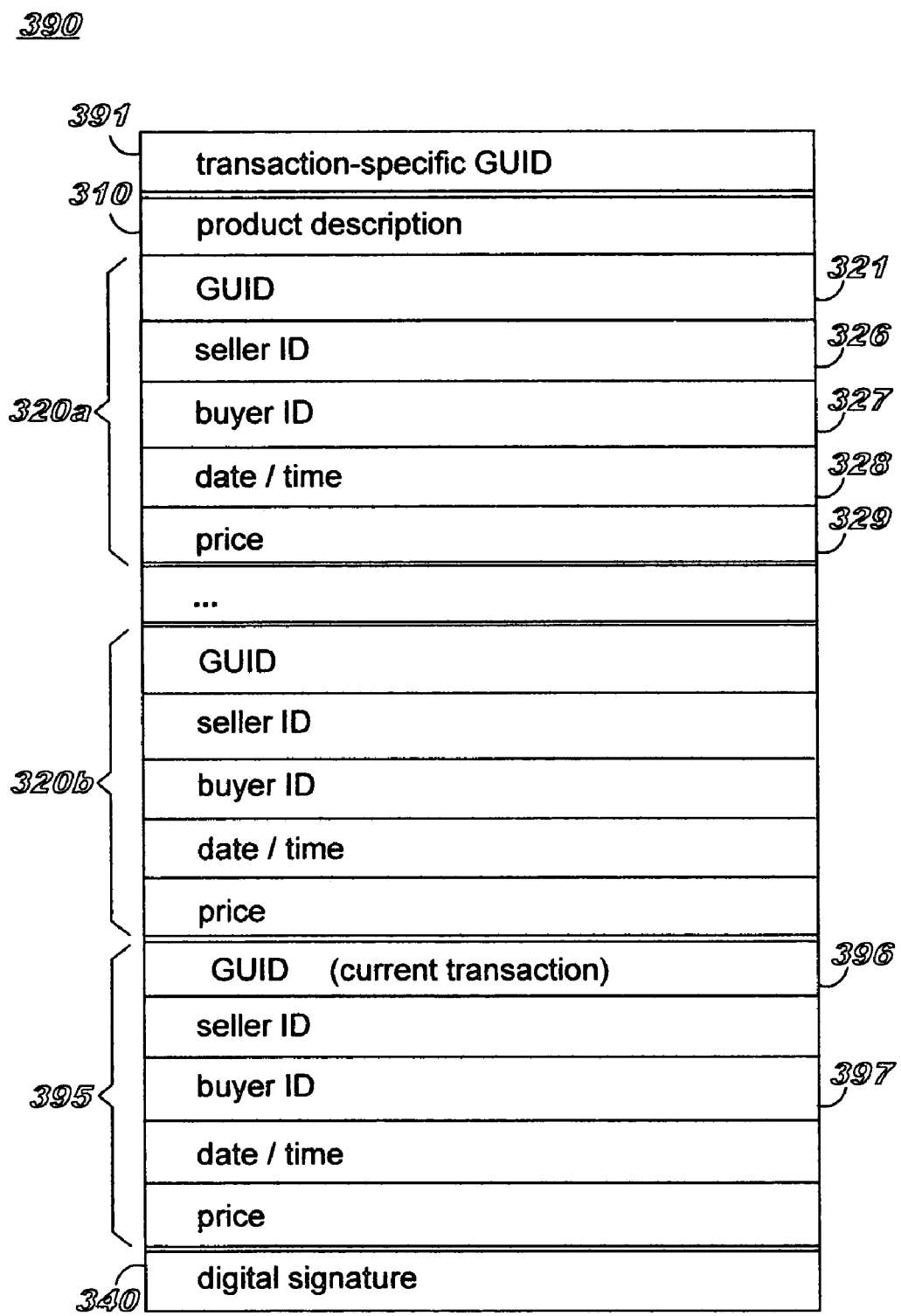

A second sample format 390 for audit records is illustrated in FIG. 3F. This format represents a scenario where the audit registrar records all information provided for the transaction (as discussed below with reference to Blocks 410–420 of FIG. 4 and Block 500 of FIG. 5), and corresponds to the on-product ownership record format 370 in FIG. 3D. In this approach, the audit registrar copies all of the information provided by the product, except for the previous digital signature, into a new audit record 390. (In the example in FIG. 3F, the copied fields are depicted at 310, 320a, and 320b.) The index to the new audit record is a newly-computed GUID, illustrated at reference number 391. Notably, this GUID is preferably repeated in field 395 (see reference number 396), in which details of this current transaction are recorded, such that the newly-computed digital signature 340 (covering all fields in audit registry record 390 except the record key at 391) is identical to the digital signature in the newly-stored on-product record having record format 370.

Turning now to FIGS. 4–13, flowcharts are provided to illustrate logic which may be used to implement several embodiments of the present invention.

Figure 4:
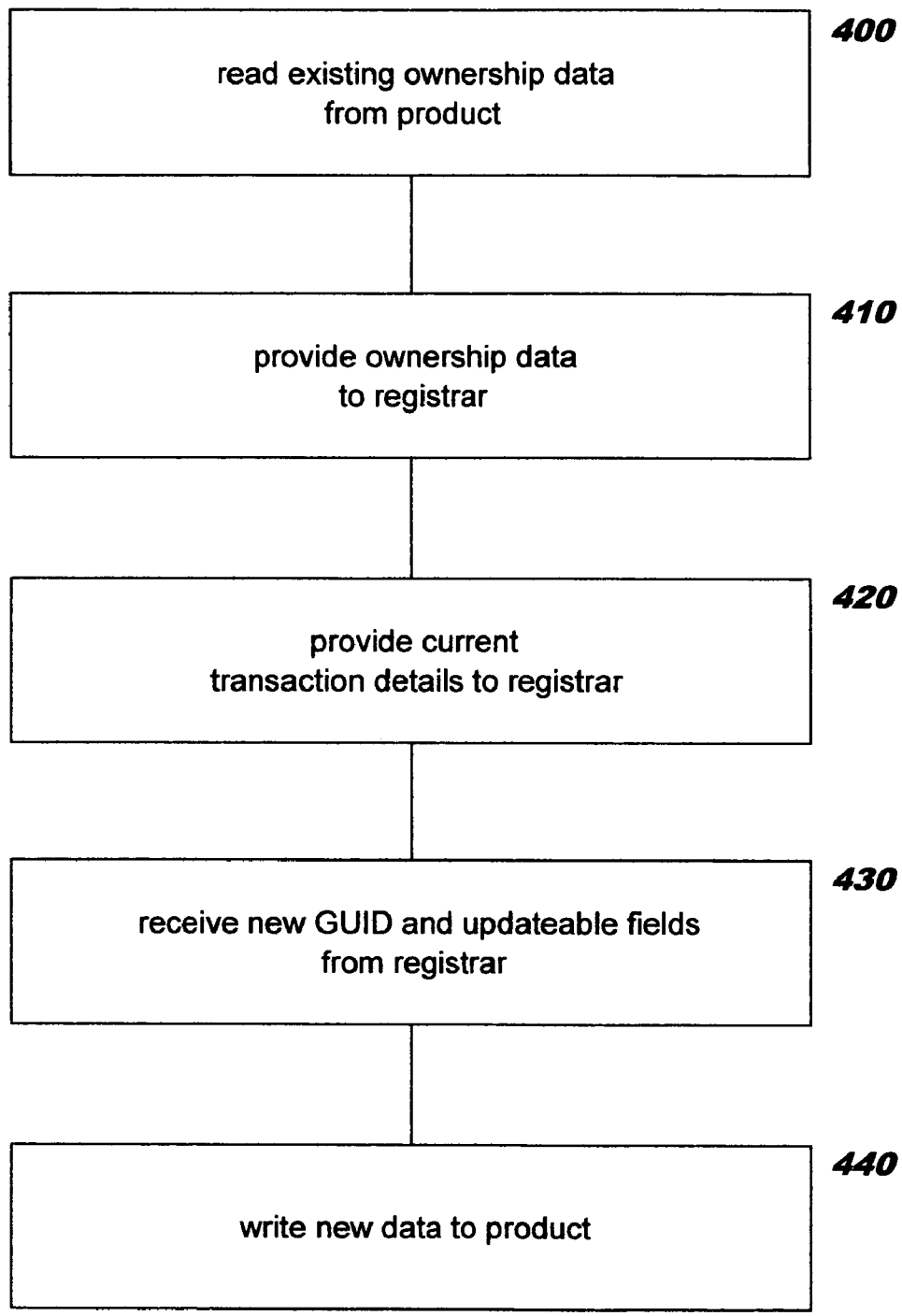
FIGS. 4–13 provide flowcharts illustrating logic that may be used when implementing several preferred embodiments of the present invention.
Figure 5:
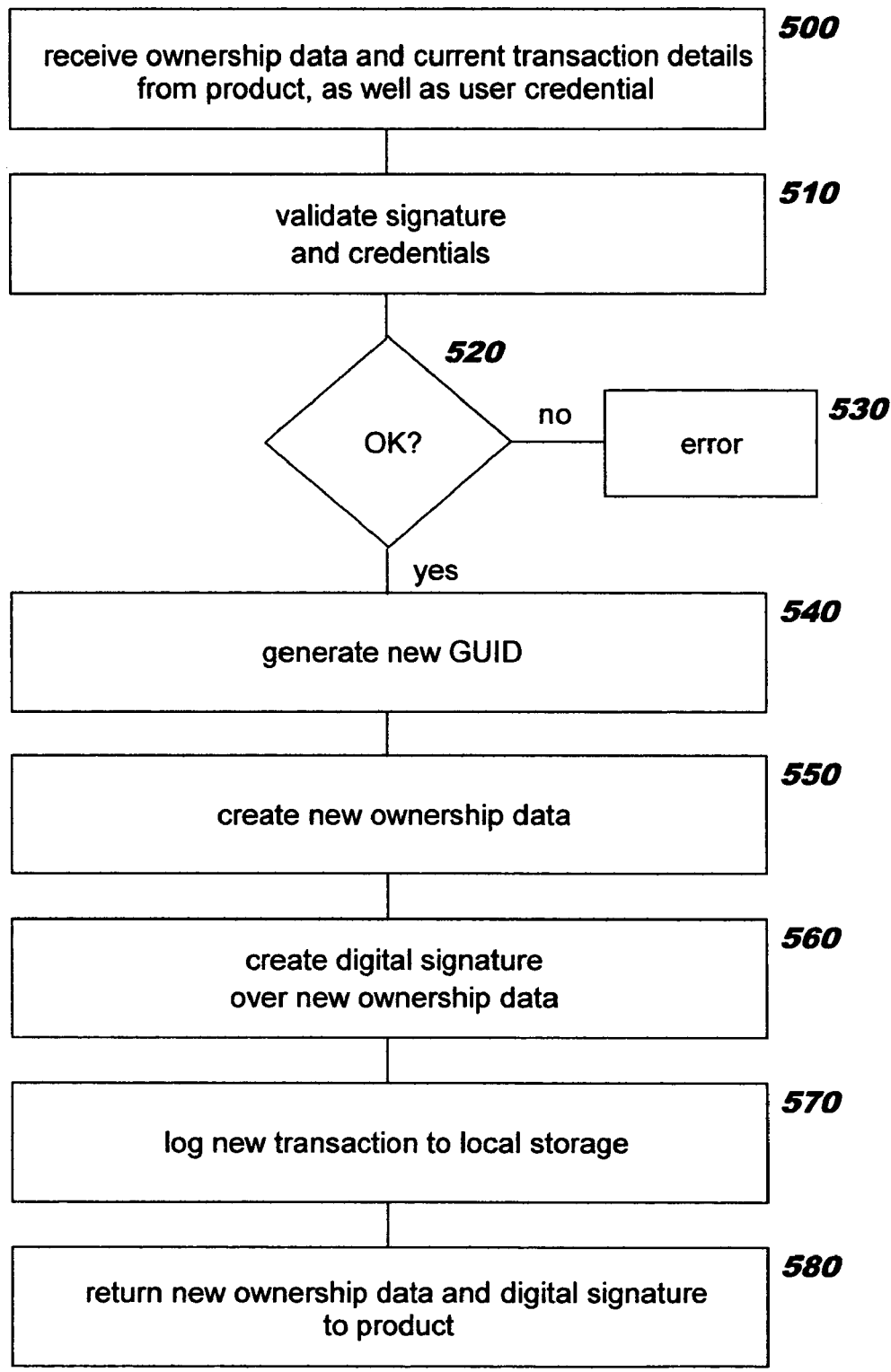

FIG. 4 illustrates a preferred embodiment of the operations that occur at a product being transferred, and FIG. 5 illustrates corresponding operations that occur at a registrar that is registering this transfer. As shown at 400 in FIG. 4, when a seller wishes to transfer a product to a buyer, existing ownership data is read from the product's RFID chip memory. This information, along with details of the intended transaction (such as the buyer ID, seller ID, date, price, etc.), is provided to the registrar, as shown at Blocks 410 and 420. In preferred embodiments, the ownership data referenced in Block 410 comprises the entire contents of the on-product ownership record (as illustrated by the sample record formats in FIGS. 3A–3D). (Note that while Blocks 410 and 420 of FIG. 4 separately specify the transfer of existing ownership data and current transaction details, this is primarily for emphasis: in an actual implementation, the data is preferably sent in one transmission. Preferably, this transmission is secured against eavesdropping and/or tampering.)

As an alternative to the product transferring the entire contents of its on-product ownership information at Block 410, an implementation of the present invention may be adapted for a different approach, where the processing at Block 410 comprises transmitting (for example) only the most-recent transfer information recorded in the RFID chip (illustrated by reference number 330 in FIG. 3A, for example). However, because the receiving registrar will compute a digital signature over the transmitted information (as discussed at Block 560, below), this approach requires a corresponding change in how the digital signature is originally computed.

Referring now to FIG. 5, the register receives the ownership data and current transaction details that are transmitted from the product according to FIG. 4, and in preferred embodiments, the credentials of the person purporting to be the current owner are also provided to the registrar (Block 500). Credentials may be presented in a number of different ways, such as a user ID and password combination, or biometric information of the user (such as a fingerprint), etc. A trusted agent may present the credentials securely, including a programmatic process using secured network transmission.

In Block 510, the registrar proceeds to validate the received data. In preferred embodiments, this validation comprises checking the registrar's signature on the transmitted data (i.e., the signature computed for the transfer of ownership to the current owner, which is shown at reference number 340 in FIGS. 3A–3D) and using the provided credentials to ensure that the person purporting to be the current owner is, in fact, the true owner. Validation of the credentials may be performed by a human being, for example by having the purported seller present a driver's license or other identification to a transfer agent. Or, the validation may be performed programmatically, in a properly adapted system. For example, the transmitted last-transaction GUID 331 may be used as an index to look up the current product ownership in the audit registry, and a provided user ID can be compared to the buyer ID recorded at 383 of the format in FIG. 3E or at 397 in FIG. 3F, to determine whether the provided credentials match the entity that is attempting to transfer ownership.

If the digital signature is valid (i.e., a "Yes" response to the test in Block 520) and the credentials are authenticated, the registrar carries out the operations of Blocks 540–580; otherwise, this is an error situation, and error handling is preferably performed (as indicated at Block 530).

The operations of Blocks 540–580 begin with the registrar generating a new GUID for the new transaction that is to be registered (Block 540). At Block 550, a new ownership record is created by the registrar in preferred embodiments, using data from the previous (on-product) ownership record plus data pertaining to the pending transfer. The ownership history portion of the new ownership record preferably includes all previously-existing ownership history data (e.g., field 320 in FIG. 3A) fields from the ownership transfer record and the pertinent sub-fields from the last-transaction information. For example, with reference to ownership record format 300 in FIG. 3A, only sub-field 331 from field 300 is used (along with field 320) when constructing the new version of ownership history field 320. When using format 370 in FIG. 3D, on the other band, the entire contents of last transaction field 330 are used when constructing the new history field 320*b*.

The last-transaction subfield of the new ownership record comprises the new GUID created at Block 540 for the current transaction and the values for the seller ID and buyer ID fields for the current transaction. Preferably, the date and time of the new transaction form part of this new ownership record as well, and other transaction-related information such as the price and/or other transaction terms may also be stored in the new ownership record, as has been discussed with reference to fields 334, 335 of FIG. 3A.

After the new ownership record has been created, the registrar preferably creates a digital signature (Block 560) over the entire record (with the exception of the digital signature field itself). As has been described, this digital signature is preferably a hash of all the other fields which is then encrypted by the registrar's private key. Computing the digital signature over the entire record, and then storing that digital signature on the product, makes it infeasible to counterfeit or falsify a product-integral ownership record (for example, by copying information from another product or selectively omitting or altering fields on the product-integral record). In addition to, or instead of, computing a digital signature over the entire contents of the new ownership record, a digital signature may be computed over another portion thereof (such as only the last-transaction field, as depicted at 387 in FIG. 3E) in alternative embodiments, without deviating from the scope of the present invention.

The data for this transaction is then logged in an audit repository (Block 570), using the newly-generated GUID as an index (as has been discussed with reference to sample formats 380 in FIGS. 3E and 390 in FIG. 3F, where the newly-generated GUID is shown as index 381 and 391, respectively). Preferably, the log is stored on media locally accessible to the registrar, although a network-connected log may be used alternatively (in which case the logging operation preferably uses secure network communications).

When the information logged at Block 570 includes the entire contents of the ownership history record, as illustrated in FIG. 3F, a product's most-recent audit record specifies its entire ownership transfer history. When using a format of the type illustrated in FIG. 3E, on the other hand, the product's ownership transfer history spans multiple audit records.

The newly-created ownership record (including its corresponding signature) are returned to the product (Block 580).

Returning again to the discussion of FIG. 4, the new ownership record and corresponding signature sent by the registrar are received (Block 430) at the product, and are then written (Block 440) to the RFID chip of the product being transferred.

Preferably, techniques disclosed in the first related invention are leveraged for updating the RFID chip in a secure manner. In particular, control bits are preferably associated with each field in the on-product ownership record, where these control bits indicate what types of operations (such as "read-only" or "read-write") are allowable on each field. Accordingly, each GUID within the product's ownership transfer history, including the product serial number, is marked as a read-only value in preferred embodiments. In addition, the optional product description field 310 is preferably marked as a read-only value as well. When the registrar creates values for the sub-fields of a new transaction (to be stored within field 330 of FIG. 3A, for example), the GUID 331 contained therein is preferably marked as a read-only value, while the remaining values are marked as read-write (i.e., registrar-updateable) values. The digital signature 340 is preferably marked by the registrar as a read-write value. (Refer to the discussion of FIG. 14, below, for more information regarding how the first related invention uses control fields to determine whether a stored field may be updated.)

Techniques other than those disclosed in the first related invention may be used to securely store information on the product, without deviating from the scope of the present invention.

In an embodiment where the product-integral ownership record is permanently recorded on the product using engraving, embossing, or similar techniques, the previously-recorded information is typically write-only by definition.

The processing for the current ownership transfer then ends, in preferred embodiments.

Figure 6:
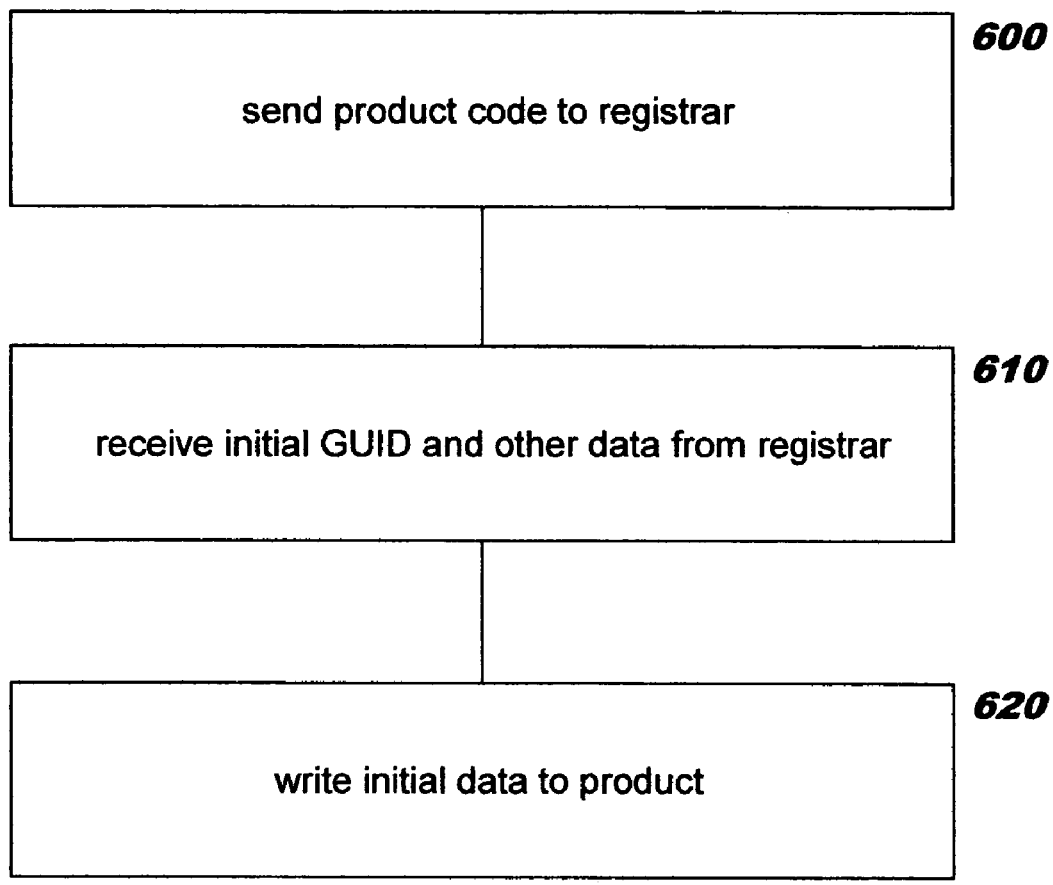
Figure 7:
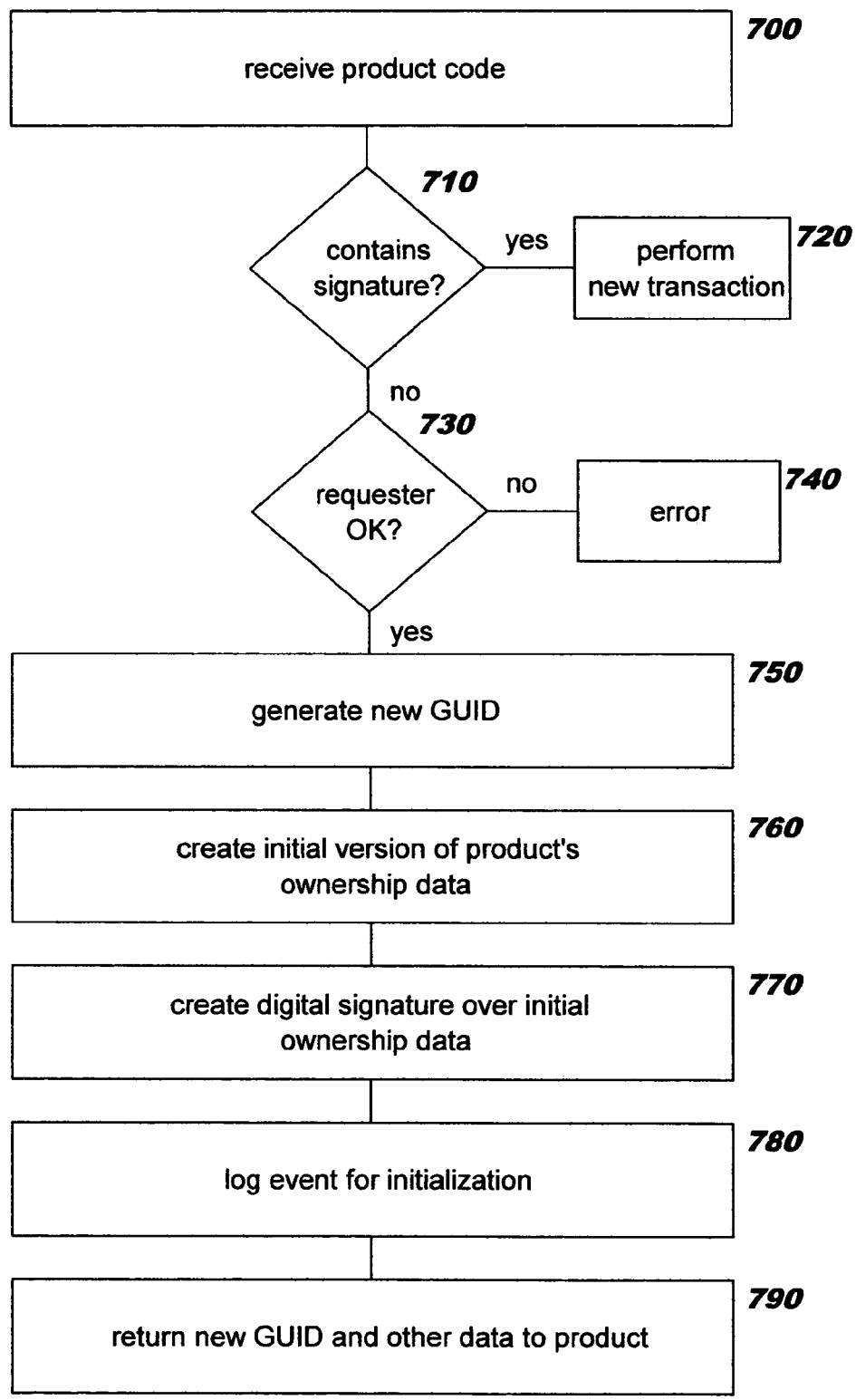

FIGS. 6 and 7 illustrate a preferred embodiment of the initialization operations which are performed for a product's ownership transfer record, and provide logic implemented on the product and at the registrar, respectively. As can be seen by comparing these figures to FIGS. 4 and 5, initializing the chip may be implemented as a special case of the general ownership transfer procedure. In preferred embodiments, since the ownership history field 320 and last transaction field 330 are empty for this not-yet-transferred product, the product code (e.g., the EPC) itself is provided to the registrar at Block 600 of FIG. 6, preferably as a read-only field. Once the registrar processes this information and returns a GUID and initial data for the ownership transfer record (as depicted in FIG. 7), the transmitted data is received (Block 610) at the product and is used to initialize the ownership transfer record stored on the product at Block 620. Preferably, this initialization comprises storing the newly-received GUID at field 321 (as the original GUID) and also storing the values received from the registrar in corresponding sub-fields of last transaction field 330.

When the product code sent at Block 600 is received by the registrar (Block 700), the registrar preferably evaluates this data to determine whether it contains a digital signature (Block 710). If a signature is found, then this is not initialization data, and processing for a new transfer transaction is preferably performed (as shown at Block 720). Otherwise, failing to find a signature, control reaches Block 730, where in preferred embodiments a verification procedure is performed (through procedures which are outside the scope of the novel subject matter of preferred embodiments) to determine whether the requester is allowed to create unique identifiers for the product code (i.e., whether the requester is allowed to request initialization of a product ownership transfer record). If this test has a negative result, this is an error situation, and error handling is preferably invoked (as shown at Block 740). Otherwise, the registrar creates a GUID (Block 750) to be used as the product's serial number. The registrar then creates initial versions of the sub-fields of the last transaction field (Block 760), and computes a signature over these initial GUID and sub-field values (Block 770).

Preferably, the initial versions of the sub-fields of the last transaction field are set at Block 760 as follows: the seller ID is set to the requester's ID; the buyer ID is set to a null value; the date and time are set to the date and time of the request; and the price is set to a null value. Alternatively, initial values for these fields may be transmitted from the product to the registrar, in an analogous manner to which details of subsequent transfers are transmitted. In this alternative situation, Block 760 uses the transmitted information. As yet another alternative, predetermined values which denote the initialization of the ownership transfer record may be used to initialize one or more of the sub-fields of the last transaction field.

At Block 780, the product creation event is logged to the audit repository. As described above with reference to FIG. 5, the information written to the log preferably comprises the newly-created GUID (which is used as an index) and the signature generated at Block 770; values used to create the sub-fields of the last transaction field are also preferably written in this initialization log record as well. The GUID and other fields (i.e., the digital signature and the sub-fields of the last transaction field, in preferred embodiments) are then returned to the requester (Block 790). As discussed above with reference to Block 620, the requester writes these for the first time to the RFID chip.

According to preferred embodiments, this first GUID becomes the auditable serial number for the product, and in addition to writing the GUID into the ownership transfer record on the RFID chip (as shown at 321 in FIGS. 3A–3D), this auditable serial number might reasonably be engraved upon or otherwise attached to the product in a human-readable form, along with the standard product code.

While the logic for initialization (FIGS. 6 and 7) is shown separately from the logic for subsequent product ownership transfers (FIGS. 4 and 5), it will be obvious to those of skill in the art that this logic may be combined in an actual implementation. In addition, it will be obvious how this combining of the logic in FIGS. 4 and 6 (for product-side processing) and of the logic in FIGS. 5 and 7 (for registrar-side processing) may be carried out.

Note that some control over the details of an ownership transfer transaction may, in some cases, be imposed by legal restrictions on the registrar that registers transfers and/or on a registrar (or other entity) that subsequently accesses the registered information during an audit. These restrictions may arise in various ways, such as through the contractual arrangement between the selling party and the chosen registrar and may require additional protections such as encryption of the transaction data deposited in the audit record. For example, the unit price of a transfer may be an extremely sensitive piece of information to the seller, or a driver's license number or similar identifying information used for authentication of the buyer might be quite sensitive from the buyer's perspective. Preferably, the novel techniques disclosed in several commonly-assigned and co-pending related U.S. patent applications are leveraged to provide this type of control. These related applications (filed on Oct. 21, 1999), which are referred to herein as "the selective XML encryption patent applications" and are hereby incorporated herein by reference, comprise the following: "Selective Data Encryption Using Style Sheet Processing" (Ser. No. 09/422,430; now U.S. Pat. No. 6,931,532); "Selective Data Encryption Using Style Sheet Processing For Decryption By A Client Proxy" (Ser. No. 09/422,537; now U.S. Pat. No. 6,961,849), "Selective Data Encryption Using Style Sheet Processing for Decryption by a Group Clerk" (Ser. No. 09/422,492; now U.S. Pat. No. 6,978,267); and "Selective Data Encryption Using Style Sheet Processing For Decryption By A Key Recovery Agent" (Ser. No. 09/422,431; now U.S. Pat. No. 6,941,459). Techniques disclosed in the selective XML encryption patent applications enable restricting access to portions of a document to one or more "communities" through use of community-specific encryption (where a "community" is a collection of authorized viewers of information, including humans as well as programmatic entities or processes). The selective XML patent applications also disclose techniques for enabling a key recovery agent to decrypt portions of a document on behalf of a community member that is properly authenticated to the key recovery agent Embodiments of the present invention preferably leverage techniques disclosed in these related applications to represent transaction data in a way that restricts access to contained field data to selective sets of viewers, and also to enable decryption by a key recovery agent (which could be used, for example, to allow access by governmental agencies under legally-required situations).

Several alternative embodiments of the present invention will now be described with reference to FIGS. 8–13.

Figure 8:
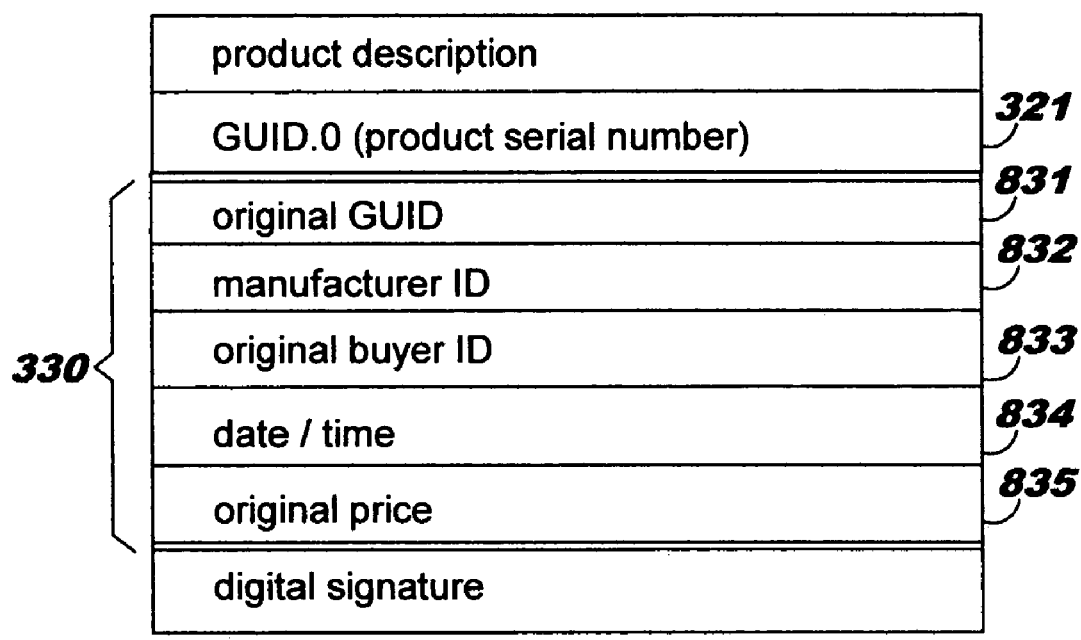

FIG. 8 illustrates how, for the special case of a merchant who re-brands a generic product, the first ownership transfer transaction that forms part of ownership transfer record (such as format 300 in FIG. 3A) can be used to represent the true origin of the generic item. This allows traceability back to the original manufacturer, as is desirable (inter alia) in a product-liability situation. The sub-fields within the last transaction field 330 are preferably used to initially record this information, and thus record 800 of FIG. 8 shows how the content of those sub-fields of format 300 is altered for this re-branding transfer situation. In particular, the GUID 831 is denoted an "original GUID" that corresponds to this transfer; the seller ID sub-field 832 is used to specify an identifier of the original manufacturer; the buyer ID subfield 833 specifies an identifier of the merchant receiving the product for re-branding; the date and time 834 represent this transfer; and the price sub-field 835 specifies the original price paid by the re-branding merchant. Note that this information will also be stored as the first record 320a within the transaction history field when using a record format as exemplified at reference number 370 in FIG. 3D, and regardless of the format of ownership transfer records, the format of the information for the re-branding transfer is preferably identical to the format used for all other transfer transactions.

Figure 9:
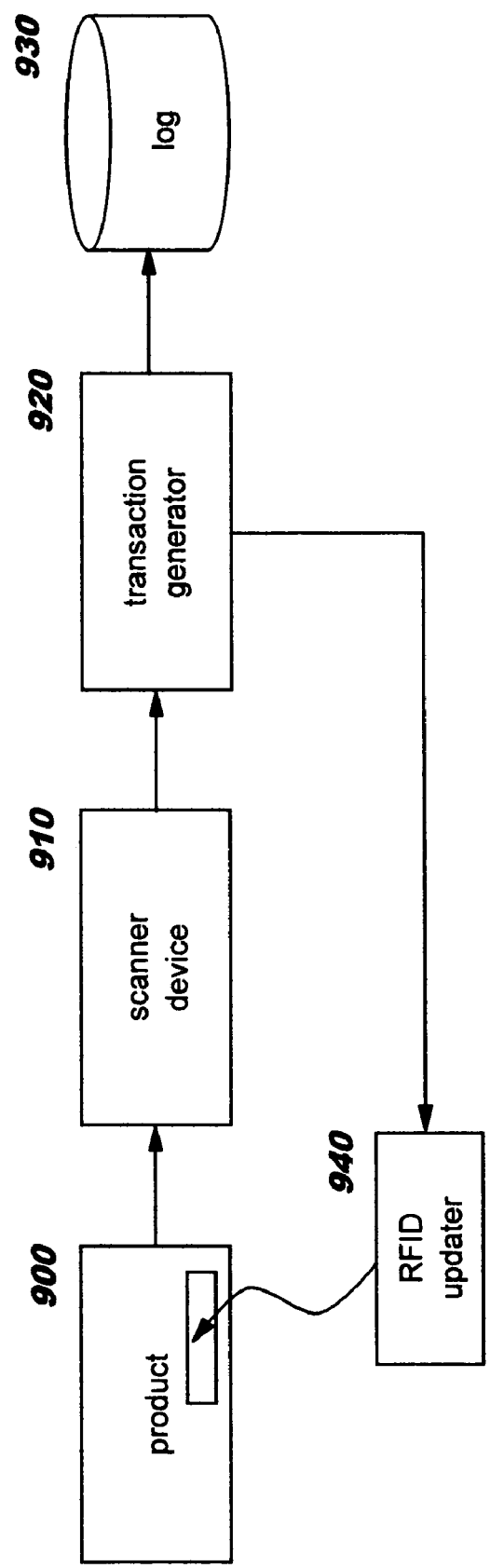
Figure 10:
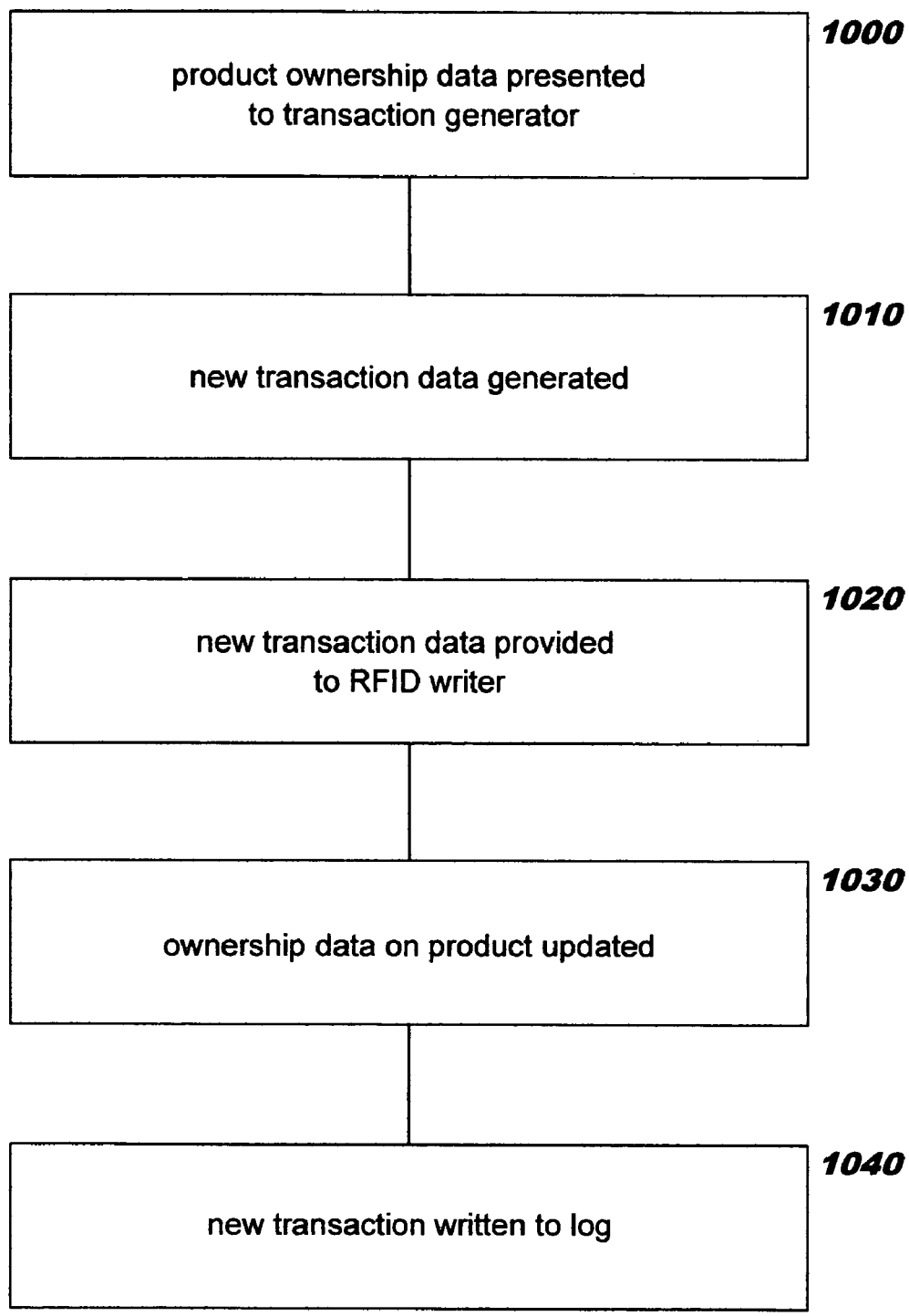

FIGS. 9 and 10 depict how a transfer of ownership via a network-connected scanning device can readily be carried out, for example in a manufacturing, wholesale, or retail situation. As shown therein, a product 900 passes by the scanning device 910, such that the product's ownership transfer data from its RFID chip is presented to the scanning device (Block 1000). A transaction generator component 920 leveraged by the scanning device generates a new GUID and new values of the sub-fields of the last transaction field to reflect this transaction (Block 1010), along with a digital signature, preferably in the manner which has been described above. Data registering the transaction is written to a log 930 (Block 1040), and the revised product ownership transfer data is provided to an RFID updater component 940 (Block 1020) which records that information in the read/write RFID chip of product 900 (Block 1030). The RFID updater component 940 is shown outside of the RFID chip 900 for drafting convenience; as will be obvious, the updater component 940 is part of the componentry on the chip of product 900. (Note that the writing of information to a log, also referred to herein as an audit repository, may occur concurrently with the returning of information to the product.)

For individuals conducting private transactions, a third party transfer agent may be used. The transfer agent may provide the service for a small fee, perhaps at a local post office, bank, check-cashing outlet, convenience store, government agency, or notary public. This would be a novel business method. For example, if Ann buys a piece of jewelry from a retailer and later sells it to Barb, Ann and Barb can go to the local transfer agent Charles who has a scanner/writer, and register the sale. This is somewhat similar to registering the transfer of a car title by providing information to the Department of Motor Vehicles (with notable differences as have been described herein, including creation of a product-integral record of transactions, securing the transfer records using digital signatures, and so forth).

Figure 11:
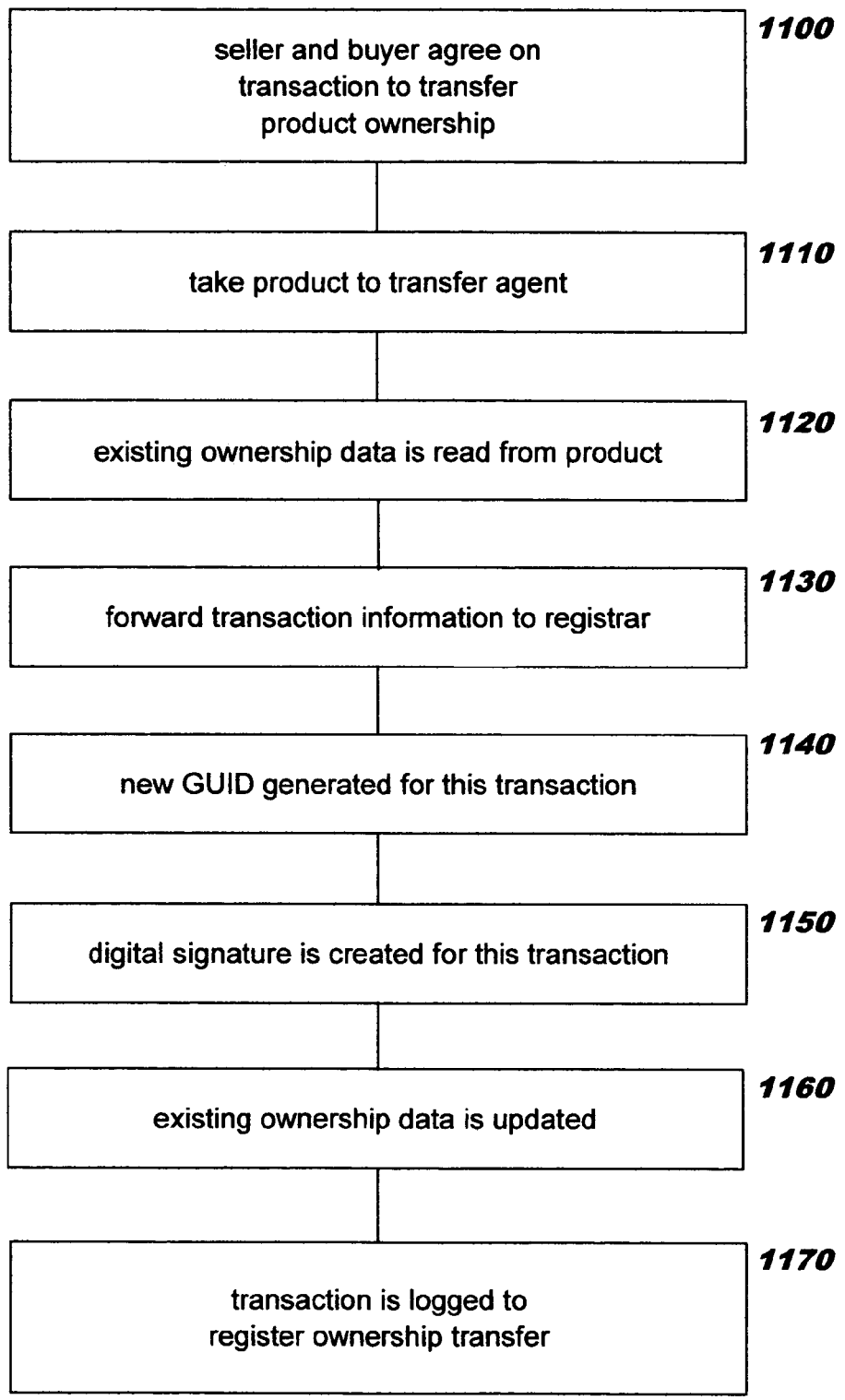

The transfer agent functions could be provided in person. This is illustrated in FIG. 11. As depicted therein, the seller and buyer agree on the terms of a transaction that transfers ownership of a product (Block 1100), and take this product to the transfer agent (Block 1110). The transfer agent uses a scanner to read the product's ownership transfer record (i.e., to request transmission of the record from the product and to receive the transmitted information), as shown at Block 1120. The transfer agent then securely forwards the pending transaction to a registrar (Block 1130). The registrar generates a new GUID to represent the current transaction (Block 1140), and creates a digital signature (Block 1150) over the sub-fields of the current transaction, as has been described with reference to element 340 of FIG. 3A. The data is securely returned to the transfer agent, who operates a privileged scanner/writer that in Blocks 1160 and 1170 updates the RFID chip's ownership record and logs the transaction to the audit repository, respectively.

In a degenerate case, the registrar functions are performed directly by the transfer agent and the registry is storage local to the transfer agent. In this embodiment, the secure data transfers may occur locally rather than over a network.

It should be noted that each registrar may maintain an independent registry (i.e., audit repository) for the transactions it registers. Alternatively, registrars may submit registration data to a central repository. In the latter case, the short ID field of the product serial number within the submitted information may be used to identify the registrar. Or, a separate field within each logged record may be used for this purpose.

Optionally, prior to generating the GUID and digital signature, the transfer agent may validate the digital signature on the ownership data provided at Block 1120 to ensure that it is valid (not shown in FIG. 11), and continue with the registration only when the validation succeeds. By validating an existing transfer record in this manner, the transfer agent can attempt to protect itself from unwittingly aiding a fraudulent seller in conveying title and potentially depriving the legitimate owner of his or her ownership rights (for example, by operation of a bona fide purchaser for value doctrine).

Figure 12:
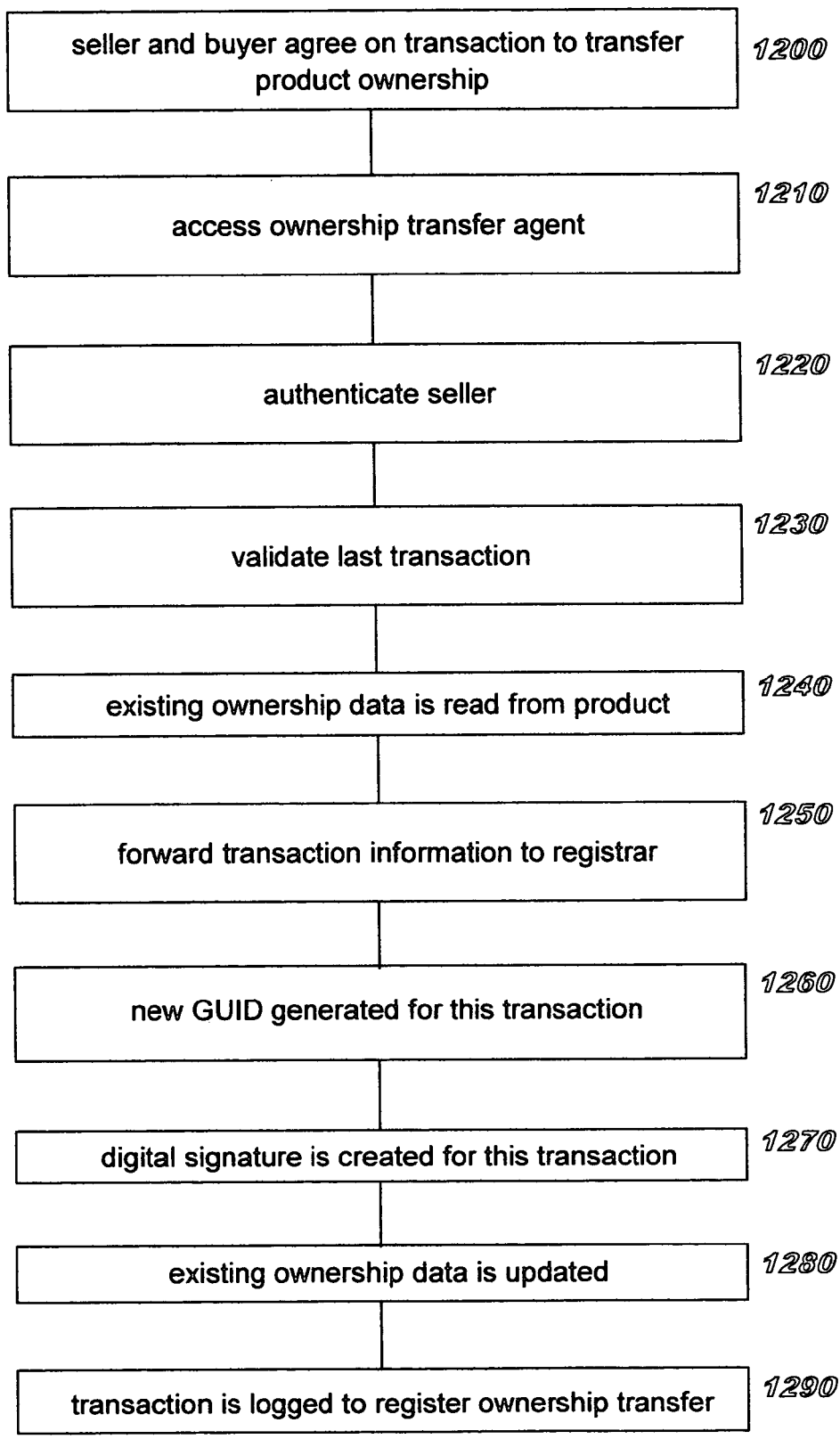

As an alternative to in-person presentation of a product to a transfer agent the transfer agent function may be provided by a web service by proxy. For example, an online web site specializing in barter and auction transactions (such as the well-known eBay® online auction service) or a financial services provider (such as the well-known PayPal® online payment service) might be a logical place for providing this type of transfer service. ("eBay" and "PayPal" are registered trademarks of eBay Inc. and PayPal, Inc., respectively.) When using a proxy, proof of identity is preferably provided to the online proxy using conventional means. This is illustrated in FIG. 12. As can be seen by inspection, operations used in FIG. 12 are similar to those of FIG. 11, except that the ownership transfer agent proxy is accessed (Block 1210), and the seller is then authenticated to this agent (Block 1220). Preferably, the proxy then validates the existing ownership data using its digital signature (Block 1230) to increase its assurance that the ownership record which has been provided from the product (at Block 1200) is legitimate. If this validation succeeds, the operations of Blocks 1240–1290, which are analogous to Blocks 1120–1170 of FIG. 11, are carried out. Otherwise, error handling (not shown in FIG. 12) is preferably performed, which may include notifying an online service provider that one of its users attempted a potentially-fraudulent transfer and/or notifying authorities of a potentially-stolen product.

Figure 13:
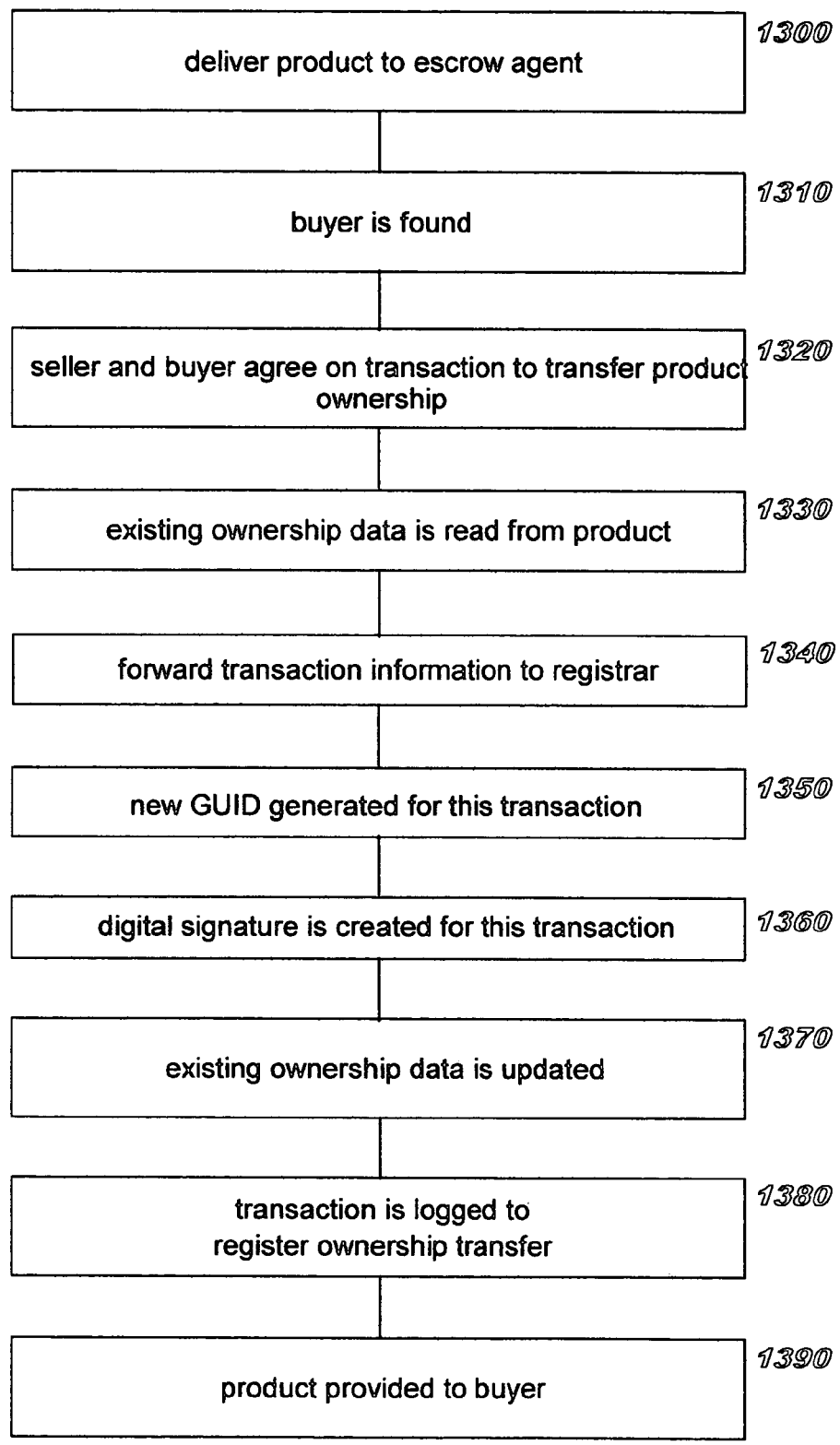

As yet another alternative approach to registering an ownership transfer, an item to be sold could be placed into the custody of a third party until a buyer is found. This is represented in FIG. 13, where the third party is referred to as an escrow agent. After the product is in the custody of this third party (Block 1300), its ownership record particulars can be read and updated. Preferably, this processing is triggered responsive to locating a buyer (Block 1310), whereby the buyer and seller agree on terms of a transaction (Block 1320) and the ownership record is then retrieved from the product and updated to reflect this transaction (Blocks 1330–1380). Following the updating of the product's information, the product is provided to the buyer (Block 1390).

As a further alternative, a transaction transferring ownership according to the present invention could finalized when the item is delivered to the post office or shipper for mailing to the new owner, where the post office or shipper provides the transfer agent service.

Figure 14:
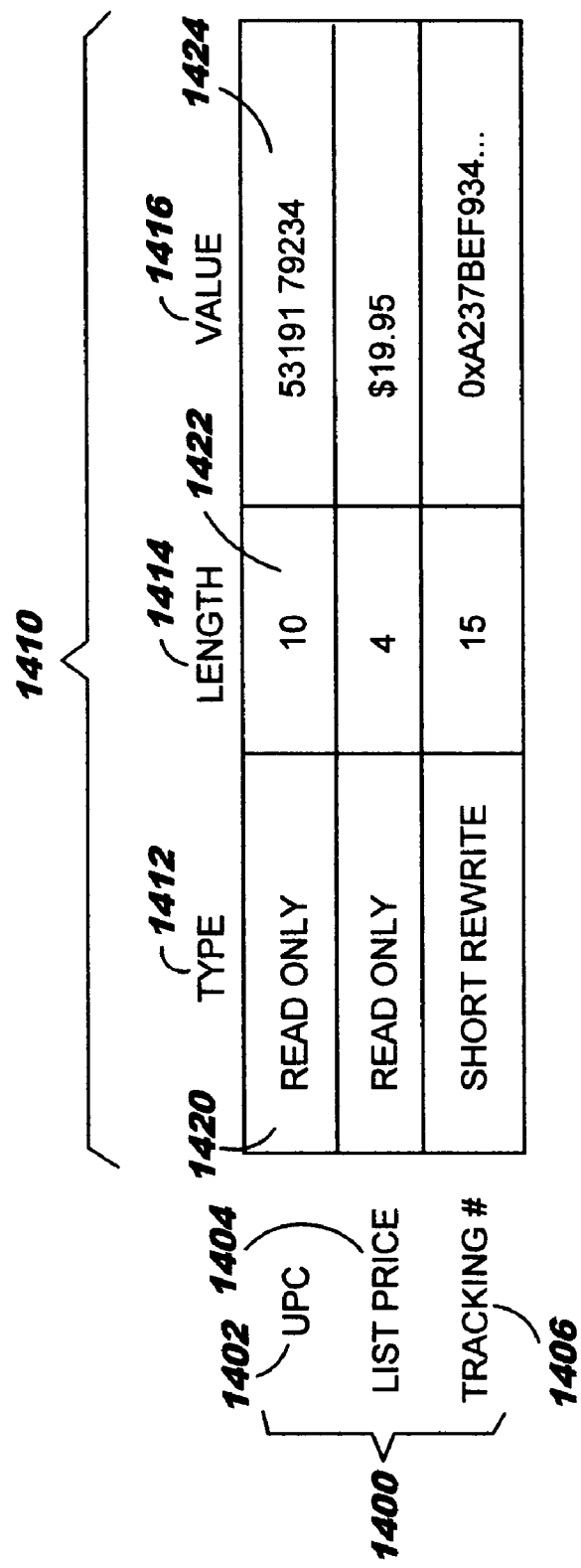
FIG. 14 illustrates how control fields may be placed within a sample field organization to control operations performed upon the field, as disclosed in the first related invention.

Turning now to FIG. 14, a sample field organization is shown to illustrate placement of control fields within a field according to the first related invention, thereby controlling the type of operation(s) that may be performed upon the field. As disclosed therein, fields are preferably organized as type, length, value triplets. FIG. 14 depicts memory contents of an RFID tag in accordance with a preferred embodiment of the first related invention, in which three basic pieces of information are stored in the tag. These are represented by rows 1400 in FIG. 14, and specify a product's UPC 1402, list price 1404, and a tracking number 1406. As disclosed in the first related invention, tracking number 1406 uniquely identifies the particular item of merchandise attached to the tag as among other items in the store or as among other items on a global scale (all items of merchandise in the world, for instance), and once an item has been purchased, the value 1416 for tracking number 1406 is rewritten as a short tracking number. (The short tracking number enables determining whether the item has been paid for, and also eliminates the ability to track a human being by tracking a globally-unique item number on a product carried by the person.)

Each of the three pieces of information in this prior art RFID tag organization is represented as a triplet 1410 comprising a type 1412, a length 1414, and a value 1416. The type field 1412 indicates to what extent the information stored on the tag may be changed. For instance, the UPC 1402 is stored on the tag in FIG. 14 using a "read-only" type designation, as shown at 1420. That means that the value 1424 of the UPC triplet 1402 cannot be changed. Other possible values for the type field 1412 include "unlimited read/write" and "short rewrite", where these types indicate that the value field 1416 is an updateable field and a field which can only be rewritten using a shorter-length value, respectively.

The length field 1414 denotes how long the information stored in the value field 1416 may be. For instance, in FIG. 14, the UPC length field 1422 limits the size of the UPC value field 1424 to 10 bytes.

This type, length, value triplet organization may be used with embodiments of the present invention to dictate which fields in the ownership transfer record 300, 350, etc., are registrar-updateable and which are not. For example, the product serial number field (reference number 321, in the examples in FIGS. 3A–3D) preferably contains bit settings in its type field that prevent updating that field.

The discussion of FIGS. 5 and 6 in the first related invention provides details explaining how the triplets may be used to control the operations on data stored in the RFID tag's memory. Preferably, the firmware in a point-of-sale RFID reader-writer honors the control bit settings in the type field, thereby ensuring (inter alia) that updates cannot be made to read-only fields, and the firmware in a special RFID reader/writer used by a registrar or transfer agent can perform privileged operations such as converting a read-write field to a read-only field and overwriting read-only fields. Reference is hereby made to the discussion of FIGS. 5 and 6 in the first related invention for more information.

As has been demonstrated, the present invention provides novel techniques for recording an auditable, non-repudiable and non-forgeable trail of product ownership transfers. A particular ownership transfer transaction may be used as an electronic receipt, and the current owner of a product may be established by consulting the last transaction recorded in its product-integral ownership transfer record.

A number of variations may be made to the embodiments disclosed herein without deviating from the scope of the present invention. Several such variations will now be described, by way of illustration but not of limitation.

While preferred embodiments have been described with reference to using radio-frequency signals, other forms of electromagnetic radiation, including visible and invisible light, could be used as a communications medium. In addition, sound waves (at an ultrasonic frequency, for instance) could also be used as a communications medium.

It should be noted that the present invention is not limited to transfers by way of sale. Barters and other types of exchanges may also be documented and registered with a transfer record of the type described herein, and the price sub-field 335 that appears in the sample format of FIGS. 3A–3F may be adapted accordingly (or may be omitted entirely by an implementation of the present invention, if desired). In addition, while embodiments of the present invention have been described herein with reference to transfers of ownership, this is by way of illustration and not of limitation. It may be desirable in some cases, for example, to provide auditable trails of possessory transfers (perhaps for high-value items that are on loan, or on consignment, from their true owner; for items that are sent out for repair; and so forth). The sub-fields of record 300 may be adapted accordingly, for example by adding a code that describes the type for a particular transfer.

The physical embodiment of the present invention is not limited to the use of electronic circuitry. For instance, research is currently being conducted in the area of optical computing components as a speedier alternative to electronic components. The present invention may be used with such technology or with as-yet-undeveloped physical data processing technology.

Physical embodiment of the present invention is not limited to the use of monolithic semiconductor chip technology. Research is being conducted in the area of chipless RFID devices. The present invention may be used with such chipless RFID technology as well as with RFID devices utilizing a semiconductor chip. In addition, the present invention is not limited specifically to RFID devices. Other types of machine-readable identification devices, for example, may be used for storing product-integral ownership information as disclosed herein.

Optionally, embodiments of the present invention may include an ability for specially-authorized users to modify the type and/or length information on an RFID tag. This would allow an entity with sufficient authority, like a privileged registrar, the ability to reset a tag to a prior state, for example (perhaps in response to erroneously registering a transaction or when some other aberrant occurrence happens).

Embodiments of the present invention may be advantageously provided wherein the current ownership of a product is recorded thereupon, but the ownership trail recording previous transfers has been omitted from the product-integral storage.

A set of commonly-owned and co-pending U.S. patent applications provides several techniques to detect shoplifting at a store exit, using a combination of RFID tags on merchandise, data written to RFID tags at the point of sale, and other identifiers. See the U.S. patent applications titled "Using RFID to Detect and/or Prevent Theft and Shoplifting" (Ser. No. 10/665,282; now U.S. Pat. No. 7,005,988), "Using Radio Frequency Identification with Customer Loyalty Cards to Detect and/or Prevent Theft and Shoplifting" (Ser. No. 10/666,483), "Using Radio Frequency Identification with Transaction-Specific Correlator Values Written on Transaction Receipts to Detect and/or Prevent Theft and Shoplifting" (Ser. No. 10/666,703; now U.S. Pat. No. 7,012,528), "Using Radio Frequency Identification with Transaction-Specific Correlator Values to Detect and/or Prevent Theft and Shoplifting" (Ser. No. 10/666,287), and "Using Radio Frequency Identification with Transaction Receipts to Detect and/or Prevent Theft and Shoplifting" (Ser. No. 10/666,700). In some embodiments, techniques disclosed in these patent applications write data, which may be a correlator containing a transaction ID, date/timestamp, sequence number, customer number, etc., to an RFID tag on merchandise at the point of sale. This is quite distinct from the present invention, which writes a non-repudiable ownership transfer log directly onto the merchandise using a variety of techniques which include, but are not limited to, RFID.

A commonly-assigned and co-pending U.S. patent application Ser. No. titled "Electronic Receipt Management" (filed Sep. 16, 2003, Ser. No. 10/663,509) replaces a traditional paper receipt with an electronic receipt that is loaded into the purchaser's pervasive computing device, making it easier for a consumer to find the relevant receipt. This patent application, however, does not teach recording ownership transfers in RFID tags as disclosed herein, nor does it teach other techniques of the present invention such as creation of auditable trails of ownership transfers.

Commonly-assigned, U.S. patent application Ser. No. 09/847,889 (filed May 3, 2001 now U.S. Pat. No. 7,076,441), titled "Identification and Tracking of Persons Using RFID-Tagged Items", discloses techniques for using RFID technology to identify or characterize people, based on the RFID tags present in items being carried by that person at a point in time. Commonly-assigned, U.S. patent application Ser. No. 10/612,251 (filed Jul. 2, 2003; now U.S. Pat. No. 6,992,574), titled "Object Matching via RFID", discloses techniques for using RFID technology to track and match objects, when the RFID tags of these objects have been programmed with data suitable for indicating that the items are in association with one another. Neither of these patent applications teach registering product ownership transactions or recording such information in an RFID tag.

Prior art ownership registration techniques include marking livestock to signify ownership using include brands and tattoos (which are more or less indelible) and/or ear tags (which can be removed and replaced). Ownership of a car or similar vehicle is signified by a number plate on the vehicle, issued by a government motor vehicle agency, that correlates to paper and/or electronic records of the ownership transfer. In addition, the motor vehicle agency typically issues a legal document of title which bears the vehicle's unique serial number and the name of the person currently registered with that agency as being the vehicle owner. These techniques are distinct from the teachings disclosed herein.

Recent-model cars carry their lifetime operational and service history in a non-volatile memory that can be read by a technician performing repairs. These logs do not include ownership transfers.

The disclosed techniques may be used advantageously in methods of doing business, for example by providing ownership transfer agent services. As an example of how this may be provided, a service may be offered that (1) receives transfer information for an ownership transfer, (2) creates a GUID to represent the transfer, (3) registers the transfer, which preferably includes computing a digital signature over the transfer information and its GUID and logging the transfer record, and (4) charges a fee. The fee might be a flat per-transaction fee, or it might be computed based on the price of the transaction. Or, the fee might be assessed using a subscription model whereby sellers pay a fixed fee for a periodic interval.

As will be appreciated by one of skill in the art, embodiments of the present invention may be provided as methods, systems, or computer program products. Embodiments of the present invention may be provided using hardware, software, or a combination thereof. Furthermore, the present invention may take the form of a computer program product which is embodied on one or more computer-readable storage media (including, but not limited to, disk storage, CD-ROM, optical storage, and so forth) having computer-readable program code or instructions embodied therein.

The present invention has been described with reference to flowchart illustrations and/or block diagrams usable in methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions, which may be stored on one or more computer-readable media, may be provided to a processor of a general purpose computer, special purpose computer, embedded processor, or other programmable data processing apparatus to produce a machine, such that the instructions, which execute via the processor of the computer or other programmable data processing apparatus, create computer-readable program code means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While several preferred embodiments of the present invention have been described, additional embodiments as well as variations and modifications in the disclosed embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer program product for providing an auditable trail of product transfers, the computer program product embodied on one or more computer-readable media and comprising:

computer-readable program code for computing, for each transfer of a particular product, a globally-unique identifier for the transfer and a cryptographic signature over one or more values describing the transfer;

computer-readable program code for recording, for each of the transfers, the cryptographic signature, the globally-unique identifier, and zero or more of the values in an ownership transfer record in a product-integral ownership repository an the particular product, wherein the ownership transfer record is access-protected using control fields to dictate which of the cryptographic signature, the globally-unique identifier, and the zero or more of the values are updateable and which are not;

computer-readable program code for recording an audit record for each of the transfers in an audit repository, wherein the audit record for each of the transfers comprises the cryptographic signature, the globally-unique identifier, and the one or more values describing the transfer; and computer-readable program code for tracing transfers of the particular product using each of the audit records that pertains to the particular product.

2. The computer program product according to claim 1, wherein each audit record that pertains to the particular product further comprises a second globally-unique identifier which was computed for a most-recent previous transfer of the particular product, and wherein the computer-readable program code for tracing further comprises iteratively using the second globally-unique identifier, when processing the audit record, to locate the audit record which records the most-recent previous transfer.

3. The computer program product according to claim 1, wherein the audit record for each of the transfers further comprises an additional globally-unique identifier that was computed for a most-recent previous transfer of the particular product.

4. The computer program product according to claim 1, wherein the product-integral ownership repository comprises a memory of a radio frequency identification device.

5. The computer program product according to claim 1, wherein the product-integral ownership repository comprises a memory of a machine-readable identification device.

6. The computer program product according to claim 1, wherein the globally-unique identifier computed for each transfer is usable as an index for retrieving the audit record for that transfer from the audit repository.

7. A method for providing an auditable trail of product transfers, comprising steps of:
computing, for each transfer of a particular product, a globally-unique identifier for the transfer and a cryptographic signature over one or more values describing the transfer;
recording, for each of the transfers, the cryptographic signature, the globally-unique identifier, and zero or more of the values in an ownership transfer record in a product-integral ownership repository on the particular product, wherein the ownership transfer record is access-protected using control fields to dictate which of the cryptographic signature, the globally-unique identifier, and the zero or more of the values are updateable and which are not;
recording an audit record for each of the transfers in an audit repository, wherein the audit record for each of the transfers comprises the cryptographic signature, the globally-unique identifier, and the one ore more values describing the transfer; and
tracing transfers of the particular product using each of the audit records that pertains to the particular product.

8. The method according to claim 7, wherein each audit record that pertains to the particular product further comprises a second globally-unique identifier which was computed for a most-recent previous transfer of the particular product, and wherein the tracing step further comprises iteratively using the second globally-unique identifier, when processing the audit record, to locate the audit record which records the most-recent previous transfer.

9. The method according to claim 7, wherein the audit record for each of the transfers further comprises an additional globally-unique identifier that was computed for a most-recent previous transfer of the particular product.

10. The method according to claim 7, wherein the product-integral ownership repository comprises a memory of a radio frequency identification device.

11. The method according to claim 7, wherein the product-integral ownership repository comprises a memory of a machine-readable identification device.

12. The method according to claim 7, wherein the globally-unique identifier computed for each transfer is usable as an index for retrieving the audit record for that transfer from the audit repository.

13. A system an auditable trail of product transfers, comprising:
means for computing, for each transfer of a particular product a globally-unique identifier for the transfer and a cryptographic signature over one or more: values describing the transfer;
means for recording, for each of the transfers, the cryptographic signature, the globally-unique identifier, and zero or more of the values in an ownership transfer record in a product-integral ownership repository on the particular product, wherein the ownership transfer record is access-protected using control fields to dictate which of the cryptographic signature, the globally-unique identifier, and the zero or more of the values are updateable and which are not;
means for recording an audit record for each of the transfers in an audit repository, wherein the audit record for each of the transfers comprises the cryptographic signature, the globally-unique identifier, and the one or more values describing the transfer; and
means for tracing transfers of the particular product using each of the audit records that pertains to the particular product.

14. The system according to claim 13, wherein each audit record that pertains to the particular product further comprises a second globally-unique identifier which was computed for a most-recent previous transfer of the particular product, and wherein the means for tracing further comprises iteratively using the second globally-unique identifier, when processing the audit record, to locate the audit record which records the most-recent previous transfer.

15. The system according to claim 13, wherein the audit record for each of the transfers further comprises an additional globally-unique identifier that was computed for a most-recent previous transfer of the particular product.

16. The system according to claim 13, wherein the product-integral ownership repository comprises a memory of a radio frequency identification device.

17. The system according to claim 13, wherein the product-integral ownership repository comprises a memory of a machine-readable identification device.

18. The system according to claim 13, wherein the globally-unique identifier computed for each transfer is usable as an index for retrieving the audit record for that transfer from the audit repository.

* * * * *